United States Patent
Takaki et al.

(10) Patent No.: US 9,638,509 B2
(45) Date of Patent: May 2, 2017

(54) PHASE DIFFERENCE DETECTOR AND ROTATION ANGLE DETECTION DEVICE INCLUDING THE SAME

(71) Applicant: JTEKT CORPORATION, Osaka-shi, Osaka (JP)

(72) Inventors: Takeshi Takaki, Shiki-gun (JP); Yuji Kariatsumari, Kitakatsuragi-gun (JP); Yoshinobu Shimizu, Sakai (JP)

(73) Assignee: JTEKT CORPORATION, Osaka-shi (JP)

( * ) Notice: Subject to any disclaimer, the term of this patent is extended or adjusted under 35 U.S.C. 154(b) by 597 days.

(21) Appl. No.: 14/104,647

(22) Filed: Dec. 12, 2013

(65) Prior Publication Data

US 2014/0163923 A1 Jun. 12, 2014

(30) Foreign Application Priority Data

Dec. 12, 2012 (JP) ................. 2012-271639

(51) Int. Cl.
| | | |
|---|---|---|
| G01C 9/00 | (2006.01) | |
| G01C 17/00 | (2006.01) | |
| G01C 19/00 | (2013.01) | |
| G01B 7/30 | (2006.01) | |
| G01D 5/244 | (2006.01) | |

(52) U.S. Cl.
CPC ............. *G01B 7/30* (2013.01); *G01D 5/244* (2013.01)

(58) Field of Classification Search
CPC .................. G01B 7/30; G01D 5/244
See application file for complete search history.

(56) References Cited

U.S. PATENT DOCUMENTS

| | | |
|---|---|---|
| 7,119,532 B2 | 10/2006 | Nihei et al. |
| 7,218,100 B1 | 5/2007 | Matsumoto et al. |
| 7,659,713 B2 | 2/2010 | Nakata et al. |

(Continued)

FOREIGN PATENT DOCUMENTS

| | | |
|---|---|---|
| EP | 1018466 A2 | 7/2000 |
| EP | 1108987 A1 | 6/2001 |

(Continued)

OTHER PUBLICATIONS

U.S. Appl. No. 14/104,408 to Takaki et al. filed Dec. 12, 2013.
(Continued)

*Primary Examiner* — David Gray
*Assistant Examiner* — Geoffrey T Evans
(74) *Attorney, Agent, or Firm* — Oliff PLC

(57) ABSTRACT

In a phase difference detector, a first phase difference computation unit computes a value of $E(i) \cdot C$ corresponding to one and the same given magnetic pole sensed by the two magnetic sensors with use of six output signals sampled at three different timings while the two magnetic sensors are sensing the given magnetic pole when a rotary body is rotating. E is an angular width error correction value, and C is a phase difference between two signals. The first phase difference computation unit executes this process until values of $E(i) \cdot C$ corresponding to all the magnetic poles are computed. After that, the first phase difference computation unit computes the phase difference between the output signals with use of the values of $E(i) \cdot C$ corresponding to all the magnetic poles and the number (m) of the magnetic poles.

9 Claims, 16 Drawing Sheets

(56) References Cited

U.S. PATENT DOCUMENTS

| | | | |
|---|---|---|---|
| 7,969,147 | B2 | 6/2011 | Hatanaka et al. |
| 9,121,729 | B2 | 9/2015 | Ueda |
| 9,523,573 | B2 * | 12/2016 | Takaki .................. G01D 5/244 |
| 2002/0111763 | A1 | 8/2002 | Koga |
| 2002/0124663 | A1 | 9/2002 | Tokumoto et al. |
| 2003/0042894 | A1 | 3/2003 | Waffenschmidt |
| 2004/0210366 | A1 | 10/2004 | Tomita |
| 2005/0052348 | A1 | 3/2005 | Yamazaki et al. |
| 2005/0150712 | A1 | 7/2005 | Tokumoto |
| 2005/0242765 | A1 | 11/2005 | Ta et al. |
| 2007/0107977 | A1 | 5/2007 | Shibata |
| 2008/0035411 | A1 | 2/2008 | Yamashita et al. |
| 2008/0047775 | A1 | 2/2008 | Yamazaki |
| 2008/0052562 | A1 | 2/2008 | Kameya et al. |
| 2008/0167780 | A1 | 7/2008 | Suzuki et al. |
| 2009/0105909 | A1 | 4/2009 | Yamaguchi |
| 2009/0190283 | A1 | 7/2009 | Hammerschmidt et al. |
| 2009/0206827 | A1 | 8/2009 | Aimuta et al. |
| 2009/0230968 | A1 | 9/2009 | Bittar et al. |
| 2009/0240389 | A1 | 9/2009 | Nomura et al. |
| 2010/0045227 | A1 | 2/2010 | Ura et al. |
| 2011/0022271 | A1 | 1/2011 | Ueda et al. |
| 2011/0181292 | A1 | 7/2011 | Oowada |
| 2011/0309824 | A1 * | 12/2011 | Takahashi ............. F16C 41/007 324/207.13 |
| 2012/0031697 | A1 | 2/2012 | Matsuda |
| 2012/0109562 | A1 | 5/2012 | Yabuguchi et al. |
| 2012/0143563 | A1 | 6/2012 | Ueda |
| 2012/0158340 | A1 | 6/2012 | Ueda |
| 2012/0158341 | A1 * | 6/2012 | Ueda .................. G01D 5/2451 702/94 |
| 2012/0182008 | A1 | 7/2012 | Ueda et al. |
| 2012/0182009 | A1 | 7/2012 | Ueda |
| 2012/0273290 | A1 | 11/2012 | Kawano et al. |
| 2012/0274260 | A1 | 11/2012 | Takahashi et al. |
| 2012/0319680 | A1 | 12/2012 | Ueda et al. |
| 2013/0035896 | A1 | 2/2013 | Ueda et al. |
| 2014/0158455 | A1 * | 6/2014 | Takaki .................. G01D 5/244 180/446 |
| 2014/0163921 | A1 * | 6/2014 | Kariatsumari ........... G01B 7/30 702/151 |
| 2014/0163922 | A1 * | 6/2014 | Takaki ................... G01B 7/30 702/151 |

FOREIGN PATENT DOCUMENTS

| | | |
|---|---|---|
| EP | 1 684 051 A1 | 7/2006 |
| EP | 2 466 268 A2 | 6/2012 |
| EP | 2 477 004 A1 | 7/2012 |
| JP | 2002-213944 A | 7/2002 |
| JP | 2006-078392 A | 3/2006 |
| JP | 2007-139739 A | 6/2007 |
| JP | A-2008-026297 | 2/2008 |
| JP | 2008-241411 A | 10/2008 |
| JP | 2008-286709 A | 11/2008 |
| JP | 2010-048760 A | 3/2010 |
| JP | 2010-110147 A | 5/2010 |

OTHER PUBLICATIONS

U.S. Appl. No. 14/104,510 to Takaki et al. filed Dec. 12, 2013.
U.S. Appl. No. 14/104,500 to Takaki et al. filed Dec. 12, 2013.
U.S. Appl. No. 14/104,322 to Kariatsumari et al. filed Dec. 12, 2013.
Mar. 4, 2016 Office Action issued in U.S. Appl. No. 14/104,408.
Apr. 29, 2014 Extended European Search Report issued in European Patent Application No. 13196422.3.
May 9, 2014 Extended European Search Report issued in European Patent Application No. 13196425.8.
Apr. 29, 2014 Extended European Search Report issued in European Patent Application No. 13196421.5.
Apr. 29, 2014 Extended European Search Report issued in European Patent Application No. 13196424.9.
Apr. 29, 2014 Extended European Search Report issued in European Patent Application No. 13196423.1.
Apr. 22, 2016 Office Action issued in U.S. Appl. No. 14/104,322.
Jun. 3, 2015 Office Action issued in U.S. Appl. No. 14/104,510.
Aug. 27, 2015 Office Action issued in U.S. Appl. No. 14/104,408.
Dec. 30, 2015 Office Action issued in U.S. Appl. No. 14/104,510.
Oct. 11, 2016 Office Action issued in U.S Appl. No. 14/104,510.
Jul. 6, 2016 Office Action issued in U.S. Appl. No. 14/104,500.
Apr. 4, 2014 Extended European Search Report issued in European Patent Application No. 11193347.9.
Jul. 3, 2014 Notice of Reasons for Rejection Issued in Japanese Patent Application No. 2010-279440.

* cited by examiner

F I G . 12

| RELATIVE POLE NUMBER | E(i)·C |
|---|---|
| 1 | |
| 2 | |
| 3 | |
| ⋮ | ⋮ |
| 7 | |
| 8 | | e1 = rows 1–8 e2: r1[n−k] ∼ r1[n]

e3: r2[n−k] ∼ r2[n]

PHASE DIFFERENCE DETECTOR AND ROTATION ANGLE DETECTION DEVICE INCLUDING THE SAME

INCORPORATION BY REFERENCE

The disclosure of Japanese Patent Application No. 2012-271639 filed on Dec. 12, 2012 including the specification, drawings and abstract is incorporated herein by reference in its entirety.

BACKGROUND OF THE INVENTION

1. Field of the Invention

The invention relates to a phase difference detector that detects a phase difference between output signals from two magnetic sensors, and a rotation angle detection device including the phase difference detector.

2. Description of the Related Art

As a rotation angle detection device that detects a rotation angle of a rotary body, there has been known a rotation angle detection device that detects a rotation angle of a rotor of a brush-less motor with the use of a detection rotor that rotates in accordance with the rotation of the brushless motor. Specifically, as illustrated in FIG. 16, a detection rotor 201 (hereinafter, referred to as "rotor 201") includes a cylindrical magnet 202 having a plurality of magnetic pole pairs corresponding to magnetic pole pairs formed in a rotor of a brushless motor. Two magnetic sensors 221, 222 are arranged around the rotor 201 at a predetermined angular interval around the rotation central axis of the rotor 201. The magnetic sensors 221, 222 respectively output sinusoidal signals having a predetermined phase difference. On the basis of the two sinusoidal signals, a rotation angle of the rotor 201 (a rotation angle of the brushless motor) is detected.

In this example, the magnet 202 has five magnetic pole pairs. That is, the magnet 202 has ten magnetic poles arranged at equal angular intervals. The magnetic poles are arranged at angular intervals of 36° (180° in electrical angle) around the rotation central axis of the rotor 201. Further, the two magnetic sensors 221, 222 are arranged at an angular interval of 18° (90° in electrical angle) around the rotation central axis of the rotor 201.

The direction indicated by an arrow in FIG. 16 is defined as the forward rotation direction of the detection rotor 201. The rotation angle of the rotor 201 increases as the rotor 201 is rotated in the forward direction, whereas the rotation angle of the rotor 201 decreases as the rotor 201 is rotated in the reverse direction. The magnetic sensors 221, 222 output sinusoidal signals $S_1$, $S_2$, respectively. As illustrated in FIG. 17, one period of each of the sinusoidal signals $S_1$, $S_2$ corresponds to a duration in which the rotor 201 rotates an angle of 72° (360° in electrical angle) corresponding to one magnetic pole pair.

The angular range corresponding to one rotation of the rotor 201 is divided into five sections corresponding to the five magnetic pole pairs, a start position of each section is defined as 0°, and an end position of each section is defined as 360°. A rotation angle of the rotor 201 expressed under the above-described conditions is an electrical angle θ of the rotor 201. In this case, the first magnetic sensor 221 outputs an output signal of $S_1 = A_1 \cdot \sin\theta$, and the second magnetic sensor 222 outputs an output signal of $S_2 = A_2 \cdot \cos\theta$. Each of $A_1$ and $A_2$ represents an amplitude. If the amplitude $A_1$ of the output signal $S_1$ and the amplitude $A_2$ of the output signal $S_2$ are assumed to be equal to each other, the electrical angle θ of the rotor 201 is obtained with the use of both the output signals $S_1$, $S_2$ based on the following expression.

$$\theta = \tan^{-1}(\sin\theta / \cos\theta)$$
$$= \tan^{-1}(S_1 / S_2)$$

The thus obtained electrical angle θ is used to control the brushless motor. Refer to, for example, Japanese Patent Application Publication No. 2008-26297 (JP 2008-26297 A).

In the above-described conventional rotation angle detection device, the rotation angle θ is computed on the assumption that the amplitudes $A_1$, $A_2$ of the output signals $S_1$, $S_2$ output from the magnetic sensors 221, 222 are equal to each other. However, the amplitudes $A_1$, $A_2$ of the output signals $S_1$, $S_2$ vary depending on variations of the temperature characteristics of the magnetic sensors 221, 222 and temperature changes. Therefore, an error may be caused in detection of a rotation angle of the rotor due to variations of the temperature characteristics of the magnetic sensors 221, 222 and temperature changes.

The inventors et al. developed a rotation angle detection device that detects a rotation angle of a rotary body such as a steering shaft, the rotation angle detection device including: two magnetic sensors that respectively output sinusoidal signals having a phase difference in accordance with rotation of the rotary body; and a computation unit that computes a rotation angle of the rotary body on the basis of a plurality of output signals from the magnetic sensors, which are sampled at different sampling timings. The computation unit is formed of, for example, an electronic control unit (ECU) including a computer.

The phase difference between the output signals from the two magnetic sensors exerts a significant influence on the rotation angle computation accuracy, and hence the phase difference needs to be accurately measured. Therefore, before factory shipment of the ECU, the phase difference between the output signals from the two magnetic sensors may be accurately measured and stored in a nonvolatile memory in the ECU. In order to accurately measure the phase difference, there may be employed a method in which waveforms of the output signals from the two magnetic sensors are monitored while the rotary body is rotated at a uniform velocity, and the phase difference is measured on the basis of the obtained waveforms and the rotation speed of the rotary body. However, in order to measure the phase difference according to such a method, a special device for rotating the rotary body at a uniform velocity is required.

If a failure or the like has occurred in the ECU and the ECU is replaced, the phase difference between the output signals from the two magnetic sensors is unknown. Therefore, the phase difference needs to be newly measured. However, in order to accurately measure the phase difference between the output signals from the two magnetic sensors, a special device for rotating the rotary body at a uniform velocity is required. Therefore, the phase difference cannot be easily measured.

SUMMARY OF THE INVENTION

One object of the invention is to provide a phase difference detector capable of easily detecting a phase difference between output signals from two magnetic sensors without using a special device, and a rotation angle detection device including the phase difference detector.

A phase difference detector according to an aspect of the invention includes: a multipolar magnet that rotates in accordance with rotation of a rotary body, and that has a plurality of magnetic poles; two magnetic sensors that are a first magnetic sensor and a second magnetic sensor, and that respectively output sinusoidal signals having a predetermined phase difference in accordance with rotation of the multipolar magnet; and a phase difference computation unit that computes the phase difference with use of the output signals from the two magnetic sensors. Where an output signal $S_1$ from the first magnetic sensor is expressed by $S_1=A_1 \sin(E_1\theta)$ in which $A_1$ is an amplitude of the output signal $S_1$, $E_1$ is a magnetic pole width error correction value for the magnetic pole sensed by the first magnetic sensor, and $\theta$ is a rotation angle of the rotary body, an output signal $S_2$ from the second magnetic sensor is expressed by $S_2=A_2 \sin(E_2\theta+C)$ in which $A_2$ is an amplitude of the output signal $S_2$, $E_2$ is a magnetic pole width error correction value for the magnetic pole sensed by the second magnetic sensor, and C is a phase difference between the output signal $S_2$ from the second magnetic sensor and the output signal $S_1$ from the first magnetic sensor, m is the number of the magnetic poles of the multipolar magnet, i is a natural number from 1 to m, which is used to relatively identify each of the magnetic poles, and E(i) is a magnetic pole width error correction value corresponding to each of the magnetic poles, the phase difference computation unit includes a first computation unit that executes a process of computing a value of E(i)·C corresponding to one and the same given magnetic pole sensed by the two magnetic sensors with use of six output signals that are sampled at three different timings while the two magnetic sensors are sensing the given magnetic pole when the rotary body is rotating, until values of E(i)·C corresponding to all the magnetic poles are computed, and a second computation unit that computes the phase difference C with use of the values of E(i)·C corresponding to all the magnetic poles computed by the first computation unit and the number m of the magnetic poles of the multipolar magnet.

In the above-described aspect, it is possible to automatically compute the phase difference between the output signals from the two magnetic sensors by rotating the rotary body. At this time, it is not necessary to rotate the rotary body at a uniform velocity. Therefore, it is possible easily detect the phase difference without using a special device.

A rotation angle detection device according to another aspect of the invention includes: the phase difference detector according to the above-described aspect; and a rotation angle computation unit that computes a rotation angle of the rotary body with use of four output signals from the two magnetic sensors, the four output signals being sampled at two different timings, and the phase difference C detected by the phase difference detector.

In this aspect, the rotation angle of the rotary body is computed with use of the four output signals from the two magnetic sensors, the four output signals being sampled at two different timings, and the phase difference C detected by the phase difference detector. Therefore, it is possible to detect the rotation angle with a higher degree of accuracy than that in the above-described conventional technique.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 12 is a schematic diagram illustrating part of contents of a memory in a torque computation ECU;

DETAILED DESCRIPTION OF EMBODIMENTS

Figure 1:
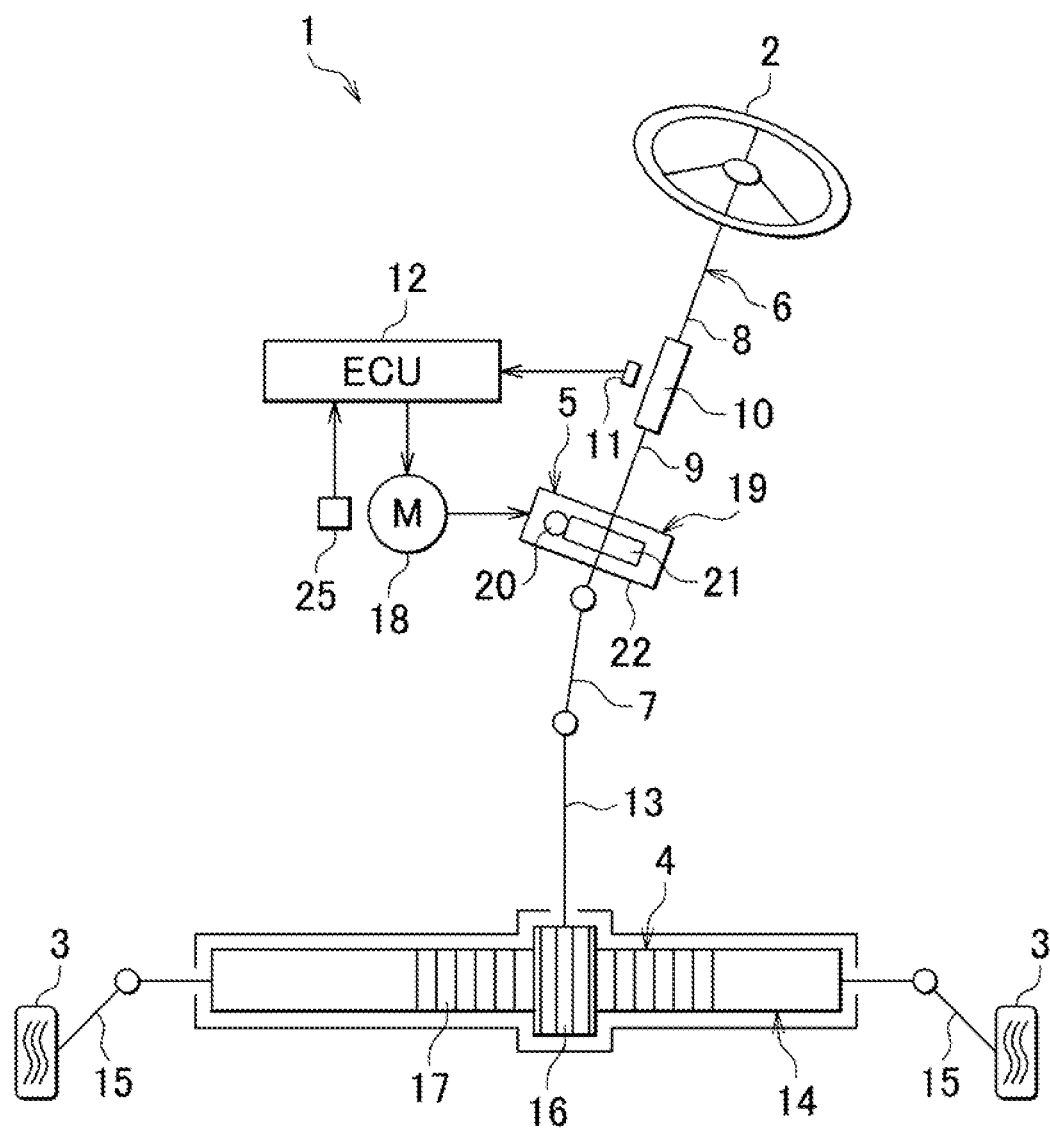
FIG. 1 is a schematic view illustrating the schematic configuration of an electric power steering system to which a rotation angle detection device according to an embodiment of the invention is applied.

Hereinafter, embodiments of the invention will be described with reference to the accompanying drawings. As illustrated in FIG. 1, an electric power steering system 1 includes a steering wheel 2, which serves as a steering member used to steer a vehicle, a steered mechanism 4 that steers steered wheels 3 in accordance with the rotation of the steering wheel 2, and a steering assist mechanism 5 used to assist a driver in performing a steering operation. The steering wheel 2 and the steered mechanism 4 are mechanically connected to each other via a steering shaft 6 and an intermediate shaft 7.

The steering shaft 6 includes an input shaft 8 connected to the steering wheel 2 and an output shaft 9 connected to the intermediate shaft 7. The input shaft 8 and the output shaft 9 are connected to each other via a torsion bar 10 so as to be rotatable relative to each other on the same axis. That is, when the steering wheel 2 is rotated, the input shaft 8 and the output shaft 9 rotate in the same direction while rotating relative to each other.

A torque sensor (torque detection device) 11, to which a phase difference detector according to an embodiment of the invention is applied, is arranged around the steering shaft 6. The torque sensor 11 detects a steering torque applied to the steering wheel 2 on the basis of a relative rotational displacement between the input shaft 8 and the output shaft 9. The steering torque detected by the torque sensor 11 is input into an electronic control unit 12 for motor control (hereinafter, referred to as "motor control ECU 12").

The steered mechanism 4 is formed of a rack-and-pinion mechanism including a pinion shaft 13 and a rack shaft 14 that serves as a steered shaft. The steered wheels 3 are connected to respective end portions of the rack shaft 14 via tie rods 15 and knuckle arms (not illustrated). The pinion shaft 13 is connected to the intermediate shaft 7. The pinion shaft 13 rotates in accordance with steering of the steering wheel 2. A pinion 16 is connected to a distal end of the pinion shaft 13.

The rack shaft 14 linearly extends along the lateral direction of the vehicle (the direction orthogonal to the direction in which the vehicle travels straight ahead). A rack 17 that meshes with the pinion 16 is formed at an axially intermediate portion of the rack shaft 14. The pinion 16 and the rack 17 convert the rotation of the pinion shaft 13 into an axial movement of the rack shaft 14. By moving the rack shaft 14 in the axial direction, the steered wheels 3 are steered.

When the steering wheel 2 is steered (rotated), the rotation is transmitted to the pinion shaft 13 via the steering shaft 6 and the intermediate shaft 7. The rotation of the pinion shaft 13 is converted into an axial movement of the rack shaft 14 by the pinion 16 and the rack 17. As a result, the steered wheels 3 are steered. The steering assist mechanism 5 includes an electric motor 18 that generates steering assist force and a speed-reduction mechanism 19 that transmits torque output from the electric motor 18 to the steered mechanism 4. The electric motor 18 is formed of a three-phase brushless motor in the present embodiment. The speed-reduction mechanism 19 is formed of s worm gear mechanism including a worm shaft 20 and a worm wheel 21 that meshes with the worm shaft 20. The speed-reduction mechanism 19 is housed in a gear housing 22 that serves as a transmission mechanism housing.

The worm shaft 20 is driven to be rotated by the electric motor 18. The worm wheel 21 is connected to the steering shaft 6 so as to be rotatable in the same direction as the rotation direction of the steering shaft 6. The worm wheel 21 is driven to be rotated by the worm shaft 20. When the worm shaft 20 is driven to be rotated by the electric motor 18, the worm wheel 21 is driven to be rotated, and the steering shaft 6 rotates. The rotation of the steering shaft 6 is transmitted to the pinion shaft 13 via the intermediate shaft 7. The rotation of the pinion shaft 13 is converted into an axial movement of the rack shaft 14. As a result, the steered wheels 3 are steered. That is, when the worm shaft 20 is driven to be rotated by the electric motor 18, the steered wheels 3 are steered.

Figure 2:
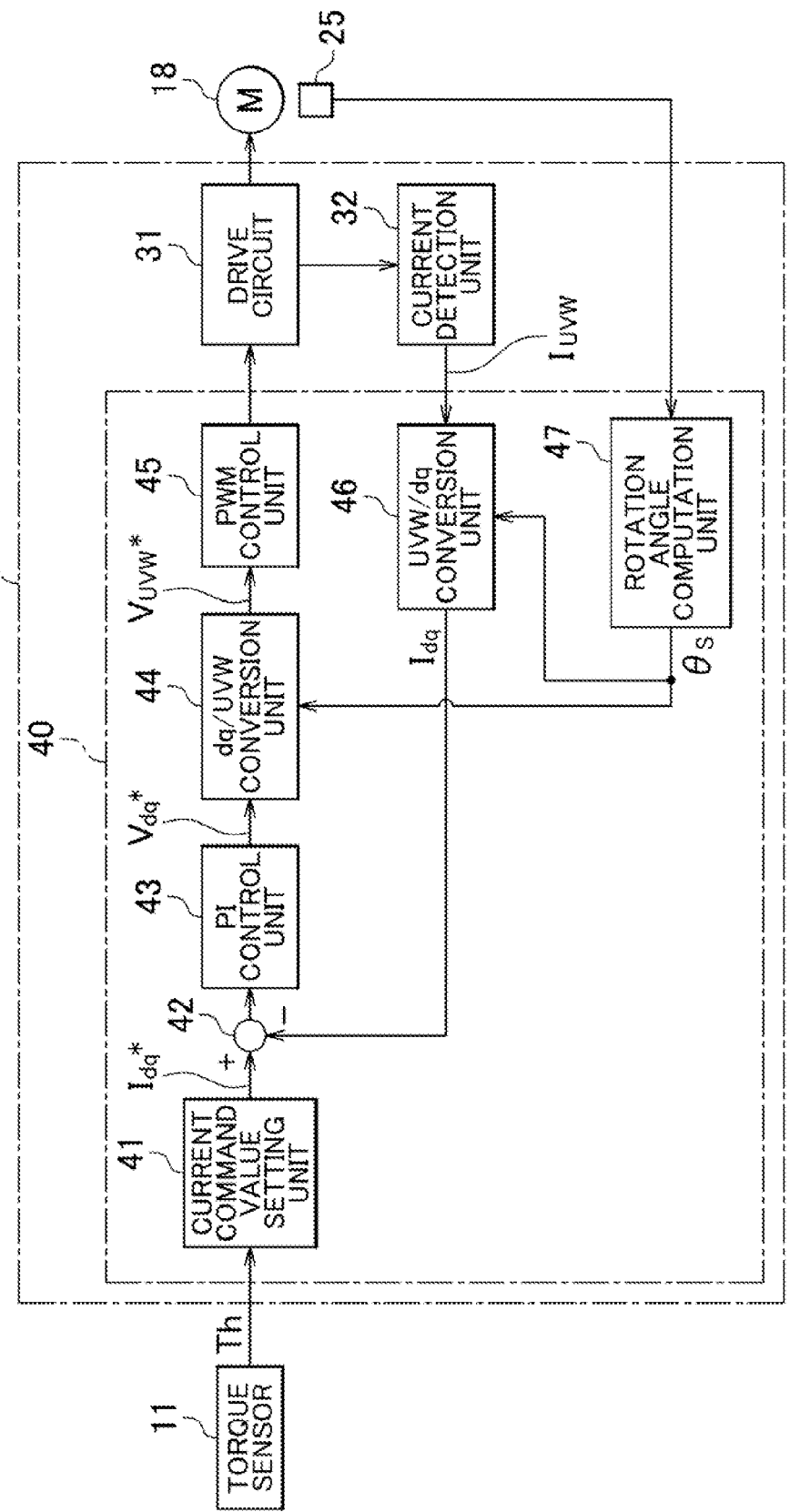
FIG. 2 is a schematic diagram illustrating the electrical configuration of a motor control ECU.

A rotation angle of a rotor of the electric motor 18 (a rotor rotation angle) is detected by a rotation angle sensor 25 such as a resolver. A signal output from the rotation angle sensor 25 is input into the motor control ECU 12. The electric motor 18 is controlled by the motor control ECU 12 that serves as a motor control unit. FIG. 2 is a schematic diagram illustrating the electrical configuration of the motor control ECU 12.

The motor control ECU 12 realizes appropriate steering assistance suited to a steering state, by driving the electric motor 18 on the basis of a steering torque Th detected by the torque sensor 11. The motor control ECU 12 includes a microcomputer 40, a drive circuit (inverter circuit) 31 that is controlled by the microcomputer 40 and that supplies electric power to the electric motor 18, and a current detection unit 32 that detects a motor current passing through the electric motor 18.

Figure 3:
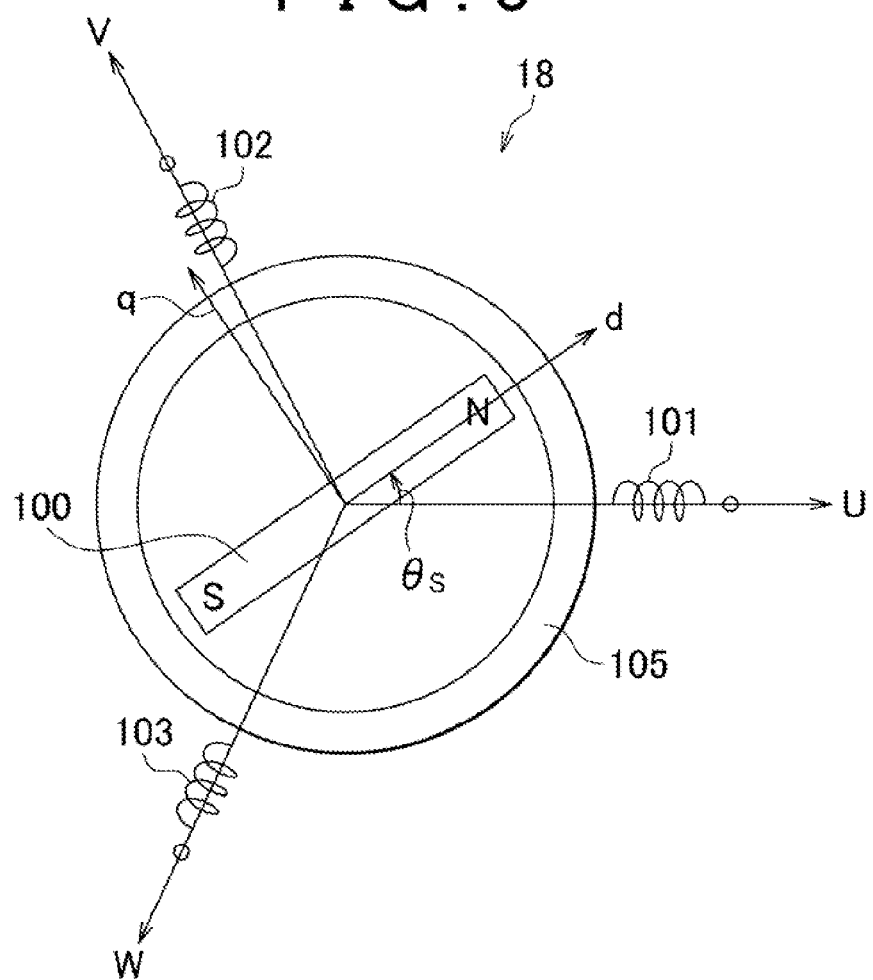
FIG. 3 is a schematic diagram schematically illustrating the configuration of an electric motor.

The electric motor 18 is, for example, a three-phase brushless motor, and includes a rotor 100, which serves as a field magnet, and a stator 105 provided with U-phase, V-phase, and W-phase stator coils 101, 102, 103, as illustrated in FIG. 3. The electric motor 18 may be an electric motor of an inner rotor type, in which a stator is arranged outside a rotor so as to face the rotor, or may be an electric motor of an outer rotor type, in which a stator is arranged inside a tubular rotor so as to face the rotor.

A UVW coordinate system that is a three-phase fixed coordinate system is defined, in which a U-axis, a V-axis, and a W-axis are set to the respective directions of the U-phase stator coil 101, the V-phase stator coil 102 and the W-phase stator coil 13. A dq coordinate system (an actual rotating coordinate system) that is a two-phase rotating coordinate system is defined, in which a d-axis that is a magnetic pole axis is set to the magnetic pole direction of the rotor 100 and a q-axis that is a torque axis is set to the direction orthogonal to the d-axis within a rotary plane of the rotor 100. The dq coordinate system is a rotating coordinate system that rotates together with the rotor 100. In the dq coordinate system, because only a q-axis current contributes to generation of torque of the rotor 100, a d-axis current is set to zero and the q-axis current is controlled on the basis of a desired torque. A rotation angle (electrical angle) θ-S of the rotor 100 is a rotation angle of the d-axis with respect to the U-axis. The dq coordinate system is an actual rotating coordinate system that rotates in accordance with the rotor angle θ-S. With the use of the rotor angle θ-S, coordinate conversion between the UVW coordinate system and the dq coordinate system can be executed.

The microcomputer 40 includes a CPU and memories (a ROM, a RAM, a non-volatile memory, etc.), and is configured to function as a plurality of functional processing units by executing predetermined programs. The functional processing units include a current command value setting unit 41, a current deviation computation unit 42, a PI (Proportional Integral) control unit 43, a dq/UVW conversion unit 44, a PWM (Pulse Width Modulation) control unit 45, a UVW/dq conversion unit 46, and a rotation angle computation unit 47.

The rotation angle computation unit 47 computes a rotor rotation angle (electrical angle) (hereinafter, referred to as "rotor angle $\theta_S$") of the electric motor 18 on the basis of a signal output from the rotation angle sensor 25. The current command value setting unit 41 sets current values, which are values of currents that should be passed through coordinate axes of the dq coordinate system, as current command values. Specifically, the current command value setting unit 41 sets a d-axis current command value $I_d^*$ and a q-axis current command, value $I_q^*$ (hereinafter, the d-axis current command value $I_d^*$ and the q-axis current, command value $I_q^*$ will be collectively referred to as "two-phase current command values $I_{dq}^*$" where appropriate). More specifically, the current command value setting unit 41 sets the q-axis current command value to a significant value, whereas it sets the d-axis current command value $I_d^*$ to zero. The current command value setting unit 41 sets the q-axis current command value $I_q^*$ on the basis of the detected steering torque Th detected by the torque sensor 11.

Figure 4:
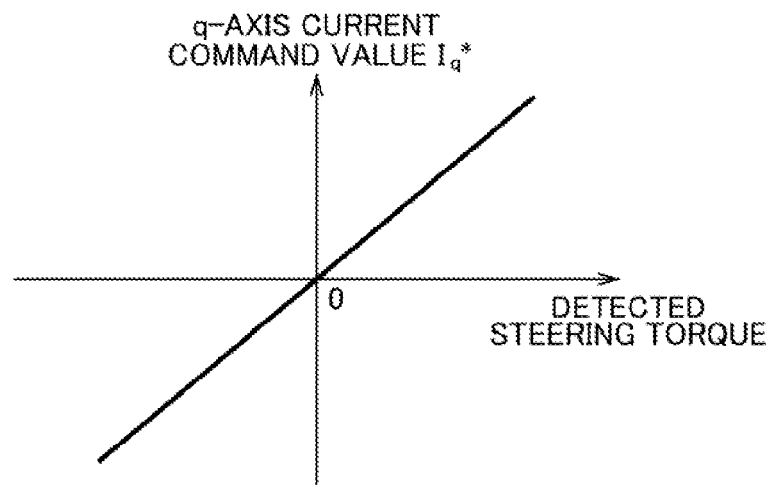
FIG. 4 is a graph illustrating an example of a manner of setting a q-axis current command value $I_q^*$ with respect to a detected steering torque Th.

An example of a manner of setting the q-axis current command value $I_q^*$ with respect to the detected steering torque Th is shown in FIG. 4. With regard to the detected steering torque Th, for example, a torque for steering to the right takes a positive value, and a torque for steering to the left takes a negative value. The q-axis current command value $I_q^*$ takes a positive value when an operation assist force for steering to the right should be generated by the electric motor 18, and takes a negative value when an operation assist force for steering to the left should be generated by the electric motor 18. The q-axis current command value $I_q^*$ with respect to a positive value of the detected steering torque Th takes a positive value, and the q-axis current command value $I_q^*$ with respect to a negative value of the detected steering torque Th takes a negative value. When the detected steering torque Th is zero, the q-axis current command value $I_q^*$ is zero. The q-axis current command value $I_q^*$ is set such that the absolute value of the q-axis current command value $I_q^*$ increases as the absolute value of the detected steering torque Th increases.

The two-phase current command values $I_{dq}^*$ set by the current command value setting unit 41 are provided to the current deviation computation unit 42. The current detection unit 32 detects a U-phase current $I_U$, a V-phase current $I_V$, and a W-phase current $I_W$ for the electric motor 18 (hereinafter, the U-phase current $I_U$, the V-phase current $I_V$, and the W-phase current $I_W$ will be collectively referred to as "three-phase detected currents $I_{UVW}$" where appropriate). The three-phase detected currents $I_{UVW}$ detected by the current detection unit 32 are provided to the UVW/dq conversion unit 46.

The UVW/dq conversion unit 46 executes coordinate conversion from the three-phase detected currents $I_{UVW}$ (the U-phase current $I_U$, the V-phase current $I_V$, and the W-phase current $I_W$) of the UVW coordinate system, detected by the current detection unit 32, into two-phase detected currents $I_d$, $I_q$ of the dq coordinate system (hereinafter, the two-phase detected currents $I_d$, $I_q$ will be collectively referred to as "two-phase detected currents $I_{dq}$" where appropriate). The rotor angle $\theta_S$ computed by the rotation angle computation, unit 47 is used for this coordinate conversion.

The current deviation computation unit 42 computes deviations between the two-phase current command values $I_{dq}^*$ set by the current command value setting unit 41 and the two-phase detected currents $I_{dq}$ provided from the UVW/dq conversion unit 46. Specifically, the current deviation computation unit 42 computes a deviation of the d-axis detected current $I_d$ with respect to the d-axis current command value $I_d^*$ and a deviation of the q-axis detected current $I_q$ with respect to the q-axis current command value $I_q^*$. These deviations are provided to the PI control unit 43.

The PI control unit 43 generates two-phase voltage command values $V_{dq}^*$ (the d-axis voltage command value $V_d^*$ and the q-axis voltage command value $V_q^*$), which are values of voltages that should be applied to the electric motor 18, by executing a PI computation on the current deviations computed by the current deviation computation unit 42. The two-phase voltage command values $V_{dq}^*$ are provided to the dq/UVW conversion unit 44. The dq/UVW conversion, unit 44 executes coordinate conversion from the two-phase voltage command values $V_{dq}^*$ into three-phase voltage command values $V_{UVW}^*$. The rotor angle $\theta_S$ computed by the rotation angle computation unit 47 is used for this coordinate conversion. The three-phase voltage command values $V_{UVW}^*$ consist of a U-phase voltage command value $V_U^*$, a V-phase voltage command value $V_V^*$, and a W-phase voltage command value $V_W^*$. The three-phase voltage command values $V_{UVW}^*$ are provided to the PWM control unit 45.

The PWM control unit 45 generates a U-phase PWM control signal, a V-phase PWM control signal, and a W-phase PWM control signal having duty ratios corresponding to the U-phase voltage command value $V_U^*$, the V-phase voltage command value $V_V^*$, and the W-phase voltage command value $V_W^*$, respectively, and provides these control signals to the drive circuit 31. The drive circuit 31 is formed of an inverter circuit with three phases corresponding to the U-phase, the V-phase, and the W-phase. When power elements constituting the inverter circuit are controlled by the PWM control signals provided from the PWM control unit 45, voltages corresponding to the three-phase voltage command values $V_{UVW}^*$ are applied to the U-phase stator coil 101, the V-phase stator coil 102 and the W-phase stator coil 103 of the electric motor 18.

Figure 5:
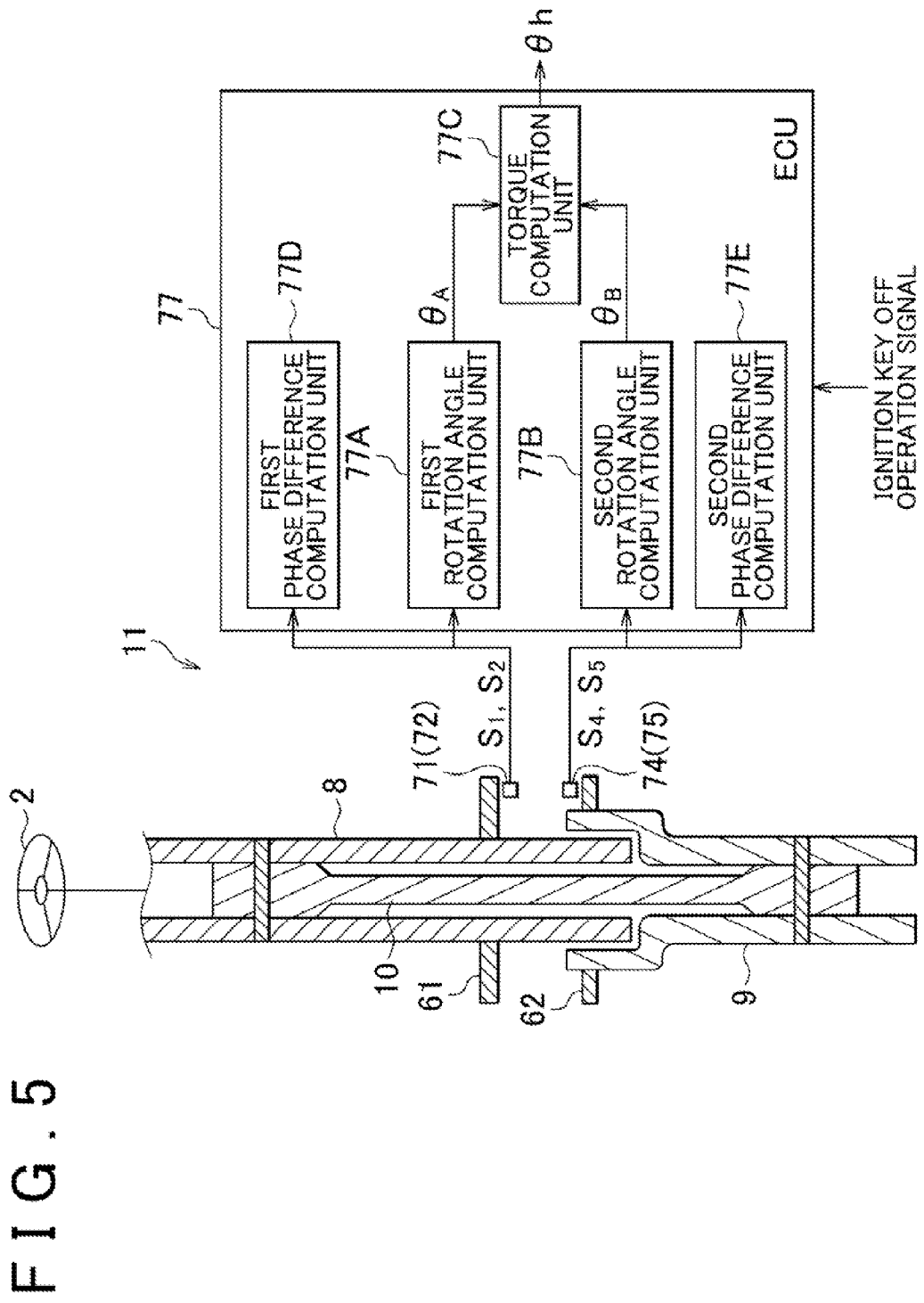
FIG. 5 is a schematic view schematically illustrating the configuration of a torque sensor.

The current deviation computation unit 42 and the PI control unit 43 constitute a current feedback controller. Due to the action of the current feedback controller, motor currents passing through the electric motor 18 are controlled so as to approach the two-phase current command values $I_{dq}^*$ set by the current command value setting unit 41. FIG. 5 is a schematic view schematically showing the configuration of the torque sensor 11.

An annular first magnet (a multipolar magnet) 61 is connected to the input shaft 8 so as to be rotatable together with the input shaft 8. Two magnetic sensors 71, 72 that respectively output sinusoidal signals having a phase difference in accordance with the rotation of the first magnet 61 are arranged below the first magnet 61. An annular second magnet (a multipolar magnet) 62 is connected to the output shaft 9 so as to be rotatable together with the output shaft 9. Two magnetic sensors 74, 75 that respectively output sinusoidal signals having a phase difference in accordance with the rotation of the second magnet 62 are arranged above the second magnet 62.

The output signals $S_1$, $S_2$, $S_4$, $S_5$ from the respective magnetic sensors 71, 72, 74, 75 are input into a torque computation ECU 77 used to compute a steering torque that is applied to the input shaft 8. A power supply for the torque computation ECU 77 is turned on when an ignition key is turned on. When the ignition key is turned off, an ignition key off operation signal indicating that the ignition key is turned off is input into the torque computation ECU 77. A magnetic sensor including an element having electrical characteristics that vary due to the action of a magnetic force, for example, a Hall element or a magnetoresistive element (a MR element) may be used as each of the magnetic sensors. In the present embodiment, a Hall element is used as each of the magnetic sensors.

The magnets 61, 62, the magnetic sensors 71, 72, 74, 75, and the torque computation ECU 77 constitute the torque sensor 11. The torque computation ECU 77 includes a microcomputer. The microcomputer is provided with a CPU and memories (a ROM, a RAM, a nonvolatile memory, etc.), and functions as a plurality of functional processing units by executing predetermined programs. The functional processing units include a first rotation angle computation unit 77A, a second rotation angle computation unit 77B, a torque computation unit 77C, a first phase difference computation unit 77D, and a second phase difference computation unit 77E.

When the operation mode of the torque computation ECU 77 is set to a phase difference detection mode by an operator or the like, the first phase difference computation unit 77D detects a phase difference between the output signals $S_1$, $S_2$ from the two magnetic sensors 71, 72 on the basis of the output signals $S_1$, $S_2$, and stores the detected phase difference in a nonvolatile memory. When the operation mode of the torque computation ECU 77 is set to the phase difference detection mode by the operator or the like, the second phase difference computation unit 77E detects a phase difference between the output signals $S_4$, $S_5$ from the two magnetic sensors 74, 75 on the basis of the output signals $S_4$, $S_5$, and stores the detected phase difference in the nonvolatile memory. For example, when the torque computation ECU 77 is replaced with a new one, the operation mode of the torque computation ECU 77 is set to the phase difference detection mode. When the phase difference is detected by the first phase difference computation unit 77D and the second phase difference computation unit 77E, the operation mode of the torque computation ECU 77 is returned to the normal mode. Details of the operations of the first phase difference computation unit 77D and the second phase difference computation unit 77E will be described later.

In the normal mode, the first rotation angle computation unit 77A computes a rotation angle (electrical angle $\theta_A$) of the input shaft 8 on the basis of the output signals $S_1$, $S_2$ from the two magnetic sensors 71, 72 and the phase difference between the output signals $S_1$, $S_2$ stored in the nonvolatile memory. In the normal mode, the second rotation angle computation unit 77B computes a rotation angle (electrical angle $\theta_B$) of the output shaft 9 on the basis of the output signals $S_4$, $S_5$ from the two magnetic sensors 74, 75 and the phase difference between the output signals $S_4$, $S_5$ stored in the nonvolatile memory.

In the normal mode, the torque computation unit 77C computes the steering torque Th applied to the input shaft 8 on the basis of the rotation angle $\theta_A$ of the input shaft 8 detected by the first rotation angle computation unit 77A and the rotation angle $\theta_B$ of the output shaft 9 detected by the second rotation angle computation unit 77B. Specifically, the steering torque Th is computed according to the following expression (1) where K is a spring constant of the torsion bar 10 and N is the number of magnetic pole pairs formed in each of the magnets 61, 62.

$$Th = \{(\theta_A - \theta_B)/N\} \times K \qquad (1)$$

The first magnet 61, the magnetic sensors 71, 72, and the first rotation angle computation unit 77A constitute a first rotation angle detection device used to detect the rotation angle $\theta_A$ of the input shaft 8. The second magnet 62, the magnetic sensors 74, 75, and the second rotation angle computation unit 77B constitute a second rotation angle detection device used to detect the rotation angle $\theta_B$ of the output shaft 9. Because an operation of the first rotation angle detection device (the first rotation angle computation unit 77A) is the same as an operation of the second rotation angle detection device (the second rotation angle computation unit 77B), only the operation of the first rotation angle detection device (the first rotation computation unit 77A) will be described below.

Figure 6:
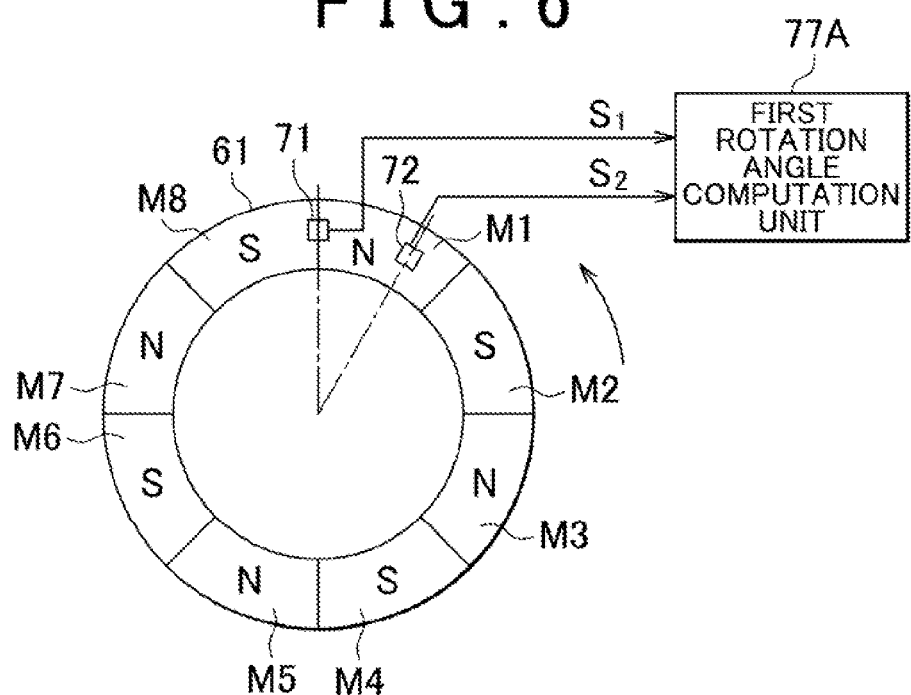
FIG. 6 is a schematic diagram illustrating the configuration of a first magnet and the arrangement of two magnetic sensors.

FIG. 6 is a schematic diagram illustrating the configuration of the first magnet 61 and the arrangement of the two magnetic sensors 71, 72. The first magnet 61 has four magnetic pole pairs (M1, M2), (M3, M4), (M5, M6), (M7, M8) arranged at equal angular intervals in the circumferential direction. That is, the first magnet 61 has the eight magnetic poles M1 to M8 arranged at the equal angular intervals. The magnetic poles M1 to M8 are arranged at angular intervals (angular widths) of approximately 45° (approximately 180° in electrical angle) around the central axis of the input shaft 8. The magnitudes of magnetic forces of the magnetic poles M1 to M8 are substantially equal to each other.

Figure 7:
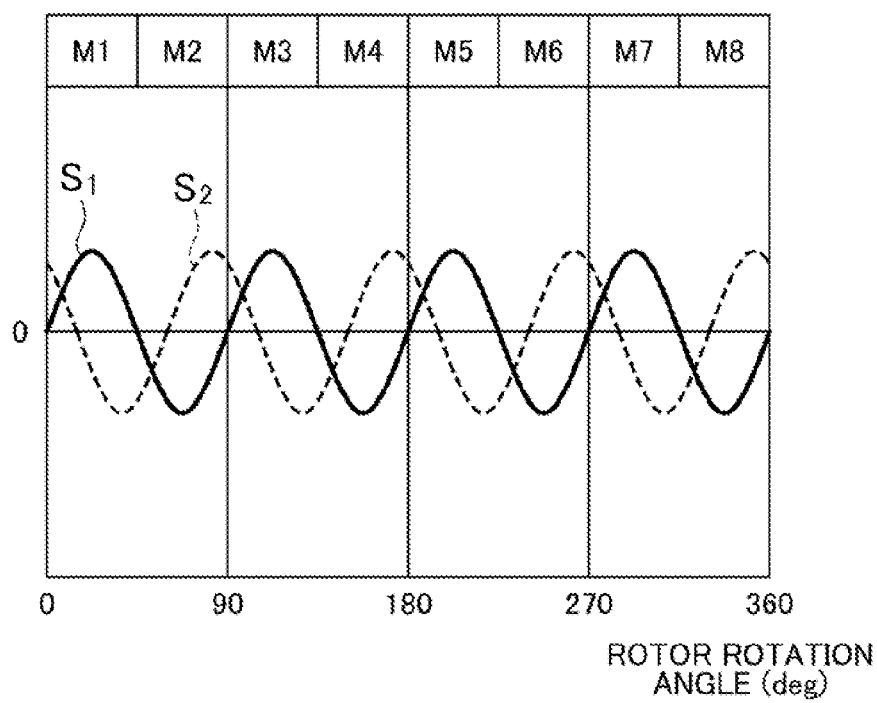
FIG. 7 is a schematic diagram illustrating waveforms of output signals from a first magnetic sensor and a second magnetic sensor.

The two magnetic sensors 71, 72 are arranged so as to face a lower annular end face of the first magnet 61. The magnetic sensors 71, 72 are arranged at an angular interval of 120° in electrical angle around the central axis of the input shaft 8. In the following description, the magnetic sensor 71 will be referred to as a first magnetic sensor 71 and the magnetic sensor 72 will be referred to as a second magnetic sensor 72 where appropriate. The direction indicated by an arrow in FIG. 6 is defined as the forward rotation direction of the input shaft 8. The rotation angle of the input shaft 8 increases as the input shaft 8 is rotated in the forward direction, and the rotation angle of the input shaft 8 decreases as the input shaft 8 is rotated in the reverse direction. Sinusoidal signals $S_1$, $S_2$ are respectively output from the magnetic sensors 71, 72 in accordance with rotation of the input shaft 8, as illustrated in FIG. 7. Note that a rotation angle (deg) on the abscissa axis in FIG. 7 represents a mechanical angle.

In the following description, the output signal $S_1$ from the first magnetic sensor 71 will be referred to as a first output signal $S_1$ or a first sensor value $S_1$, and the output signal $S_2$ from the second magnetic sensor 72 will be referred to as a second output signal $S_2$ or a second sensor value $S_2$ where appropriate. In the following description, a rotation angle of the input shaft 8 will be denoted by $\theta$ instead of $\theta_A$, for convenience of explanation. If each of the output signals $S_1$, $S_2$ is a sinusoidal signal and a rotation angle of the input shaft 8 is $\theta$ (electrical angle), the output signal $S_1$ from the first magnetic sensor 71 is expressed by $S_1 = A_1 \cdot \sin \theta$, and the output signal $S_2$ from the second magnetic sensor 72 is represented as $S_2 = A_2 \cdot \sin(\theta + C)$. Each of $A_1$, $A_2$ represents an amplitude. C represents a phase difference between the first output signal $S_1$ and the second output signal $S_2$.

A basic concept of a method of computing the rotation angle $\theta$ with the use of the first rotation angle computation unit 77A will be described. There are two methods of computing the rotation angle $\theta$. The first method is a method of computing the rotation angle $\theta$ on the basis of output signals from the two magnetic sensors 71, 72, the output signals being sampled at two sampling timings (hereinafter, the first method will be referred to as "first computing method"). The second method is a method of computing the rotation angle $\theta$ on the basis of output signals from the two magnetic sensors 71, 72, the output signals being sampled at three sampling timings (hereinafter, the second method will be referred to as "second computing method").

A basic concept of the first computing method will be described. A phase difference (electrical angle) between the first output signal $S_1$ and the second output signal will be denoted by C. The number of a present sampling period (the number of a present computation period) will be denoted by (n) and the number of an immediately preceding sampling period (the number of an immediately preceding computation period) will be denoted by (n−1). With the use of the phase difference C and the numbers (n), (n−1) of the sampling periods, the first-output signal $S_1$ sampled in the present sampling period, the first output signal $S_1$ sampled in the immediately preceding sampling period, the second output signal $S_2$ sampled in the present sampling period, and the second output signal $S_2$ sampled in the immediately preceding sampling period are expressed, by the following expressions (2a), (2b), (2c), (2d), respectively.

$$S_1(n)=A_1(n)\sin\theta(n) \quad (2a)$$

$$S_1(n-1)=A_1(n-1)\sin\theta(n-1) \quad (2b)$$

$$S_2(n)=A_2(n)\sin(\theta(n)+C) \quad (2c)$$

$$S_2(n-1)=A_2(n-1)\sin(\theta(n-1)+C) \quad (2d)$$

If C is a known quantity, the number of unknown quantifies ($A_1(n)$, $A_1(n-1)$, $A_2(n)$, $A_2(n-1)$, $\theta(n)$, $\theta(n-1)$) included in the four expressions is six. That, is, because the number of the unknown quantities is greater than the number of the expressions, simultaneous equations constituted of the four expressions cannot be solved in this state.

Therefore, by setting a short sampling interval (sampling period), variations of amplitudes due to temperature changes between two sampling timings are assumed to be nonexistent. That is, on the assumption that amplitudes $A_1(n)$, $A_1(n-1)$ of the output signals from the first magnetic sensor 71 at two sampling timings are equal to each other, the amplitudes $A_1(n)$, $A_1(n-1)$ are expressed by $A_1$. Similarly, on the assumption that amplitudes $A_2(n)$, $A_2(n-1)$ of the output signals from the second magnetic sensor 72 at two sampling timings are equal to each other, the amplitudes $A_2(n)$, $A_2(n-1)$ are expressed by $A_2$. Thus, the expressions (2a), (2b), (2e), (2d) can be expressed by the following expressions (3a), (3b), (3c), (3d), respectively.

$$S_1(n)=A_1\sin\theta(n) \quad (3a)$$

$$S_1(n-1)=A_1\sin\theta(n-1) \quad (3b)$$

$$S_2(n)=A_2\sin(\theta(n)+C) \quad (3c)$$

$$S_2(n-1)=A_2\sin(\theta(n-1)+C) \quad (3d)$$

The number of unknown quantities ($A_1$, $A_2$, $\theta(n)$, $\theta(n-1)$) included in the four expressions is four. That is, because the number of the unknown quantities is equal to or smaller than the number of expressions, simultaneous equations constituted of the four expressions can be solved. Therefore, by solving the simultaneous equations constituted of the four expressions (3a), (3b), (3c), (3d), the rotation angle $\theta(n)$ of the input shaft 8 can be computed.

Hereinafter, the case where the phase difference C between the sinusoidal signals respectively output from the magnetic sensors 71, 72 is 120° will be described in detail. When the phase difference C is 120°, the four expressions (3a), (3b), (3c), (3d) can be expressed by the following expressions (4a), (4b), (4c), (4d), respectively.

$$S_1(n)=A_1\sin\theta(n) \quad (4a)$$

$$S_1(n-1)=A_1\sin\theta(n-1) \quad (4b)$$

$$S_2(n)=A_2\sin(\theta(n)+120) \quad (4c)$$

$$S_2(n-1)=A_2\sin(\theta(n-1)+120) \quad (4d)$$

By solving simultaneous equations constituted of the four expressions (4a), (4b), (4c), (4d), the rotation angle $\theta(n)$ of the input shaft 8 can be expressed by the following expression (5) (hereinafter, referred to as "basic arithmetic expression (5)").

$$\theta[n] = \frac{1}{4}\cos^{-1}\left(1 - \frac{(3p_1^2 p_2^2 - 2p_1^2 - 2p_2^2 + p_1 p_2)^2}{2(p_1 - p_2)^2(p_1^2 + p_1 p_2 + p_2^2)}\right) - \frac{1}{4}\cos^{-1}\left(\frac{1}{2} - \frac{3}{2}\cdot\frac{p_1 p_2 + p_2^2}{p_1^2 + p_1 p_2 + p_2^2}\right) \quad (5)$$

where $$p_1 = \frac{S_1[n]}{S_1[n-1]}$$

$$p_2 = \frac{S_2[n]}{S_2[n-1]}$$

Therefore, when the phase difference C between the sinusoidal signals respectively output from the magnetic sensors is 120°, the rotation angle $\theta(n)$ of the Input shaft 8 can be computed, with the use of four sensor values $S_1(n)$, $S_1(n-1)$, $S_2(n)$, $S_2(n-1)$ and the basic arithmetic expression (5). However, when at least one of the denominators of the fractions included in the basic arithmetic expression (5) is zero, the rotation angle $\theta(n)$ cannot be computed according to the basic arithmetic expression (5). Therefore, in the present embodiment, when at least one of the denominators of the fractions included in the basic arithmetic expression (5) is zero, the rotation angle $\theta(n)$ is computed according to an arithmetic expression different from the basic arithmetic expression (5). Further, in the present embodiment, if the rotation angle $\theta(n)$ can be computed according to an arithmetic expression that is simpler than the basic arithmetic expression (5) although the rotation angle $\theta(n)$ can be computed according to the basic arithmetic expression (5), the rotation angle $\theta(n)$ is computed according to the arithmetic expression that is simpler than the basic arithmetic expression (5). In the present embodiment, the case where the rotation angle $\theta(n)$ can be computed more easily than using the basic arithmetic expression (5) is the case where $S_2(n)=0$ or the case where $S_1(n)=0$.

In the present embodiment, as arithmetic expressions used to compute the rotation angle $\theta(n)$, ten kinds of arithmetic expressions including the basic arithmetic expression (5) are prepared. Table 1 shows the ten kinds of arithmetic expressions and the conditions for the arithmetic expressions. Note that, at the time of computing the rotation angle $\theta(n)$, whether the conditions are satisfied is determined starting from the conditions on the top of Table 1. If it is determined that the conditions are satisfied, whether the subsequent conditions are satisfied is not determined. Then, the rotation angle $\theta(n)$ is computed according to the arithmetic expression corresponding to the conditions that are determined to be satisfied.

TABLE 1

| | CONDITIONS (AND) | ARITHMETIC EXPRESSIONS |
|---|---|---|
| 1 | $S_1[n] \neq 0$, $S_2[n-1] \neq 0$, $S_2[n] \neq 0$, $S_1[n-1] \neq 0$, $P_1 - P_2 \neq 0$ | BASIC ARITHMETIC EXPRESSION (EXPRESSION (5)) |

TABLE 1-continued

| CONDITIONS (AND) | ARITHMETIC EXPRESSIONS |
|---|---|
| 2 $S_1[n] \neq 0$, $S_2[n-1] \neq 0$, $S_2[n] \neq 0$, $S_1[n-1] \neq 0$, $P_1-P_2 = 0$ | $\theta[n] \leftarrow$ IMMEDIATELY PRECEDING VALUE |
| 3 $S_1[n] \neq 0$, $S_2[n-1] \neq 0$, $S_2[n] \neq 0$, $S_1[n-1] = 0$, $S_2[n-1] > 0$ | $\theta[n] = \sin^{-1}\left(\frac{\sqrt{3}}{2} \cdot \frac{S_2[n]}{S_2[n-1]}\right) - 120$ |
| 4 $S_1[n] \neq 0$, $S_2[n-1] \neq 0$, $S_2[n] \neq 0$, $S_1[n-1] = 0$, $S_2[n-1] < 0$ | $\theta[n] = \sin^{-1}\left(-\frac{\sqrt{3}}{2} \cdot \frac{S_2[n]}{S_2[n-1]}\right) - 120$ |
| 5 $S_1[n] \neq 0$, $S_2[n-1] \neq 0$, $S_2[n] = 0$, $S_1[n] > 0$ | $\theta[n] = 60$ |
| 6 $S_1[n] \neq 0$, $S_2[n-1] \neq 0$, $S_2[n] = 0$, $S_1[n] < 0$ | $\theta[n] = -120$ |
| 7 $S_1[n] \neq 0$, $S_2[n-1] = 0$, $S_1[n-1] > 0$ | $\theta[n] = \sin^{-1}\left(\frac{\sqrt{3}}{2} \cdot \frac{S_1[n]}{S_1[n-1]}\right)$ |
| 8 $S_1[n] \neq 0$, $S_2[n-1] = 0$, $S_1[n-1] < 0$ | $\theta[n] = \sin^{-1}\left(-\frac{\sqrt{3}}{2} \cdot \frac{S_1[n]}{S_1[n-1]}\right)$ |
| 9 $S_1[n] = 0$, $S_2[n] > 0$ | $\theta[n] = 0$ |
| 10 $S_1[n] = 0$, $S_2[n] < 0$ | $\theta[n] = 180$ |

The first arithmetic expression from the top of Table 1 is the basic arithmetic expression (5). The basic arithmetic expression (5) is used when the condition that neither $S_1(n)$ nor $S_2(n)$ is zero and the condition that none of the denominators of the fractions included in the basic arithmetic expression (5) are zero are both satisfied. The condition that none of the denominators of the fractions included in the basic arithmetic expression (5) are zero is satisfied when $p_1-p_2 \neq 0$, $p_1^2+p_1p_2+p_2^2 \neq 0$, $S_1(n-1) \neq 0$, and $S_2(n-1) \neq 0$. Note that $S_1(n-1)$ is the denominator of $p_1$ and $S_2(n-1)$ is the denominator of $p_2$.

Note that, $p_1^2+p_1p_2+p_2^2=0$ is satisfied only when $p_1=p_2=0$. However, the phase of a sinusoidal signal output from the first magnetic sensor 71 is 120° different from the phase of a sinusoidal signal output from the second magnetic sensor 72, and hence the sensor values $S_1$, $S_2$ from both the magnetic sensors 71, 72 do not become zero at the same time. Therefore, $p_1^2+p_1p_2+p_2^2=0$ is not satisfied. Therefore, the condition that none of the denominators of the fractions included in the basic arithmetic expression (5) are zero is satisfied when all the conditions that $p_1-p_2 \neq 0$, $S_1(n-1) \neq 0$, and $S_2(n-1) \neq 0$ are satisfied.

The second arithmetic expression from the top of Table 1 is an arithmetic expression that is used when $p_1-p_2=0$. The case where $p_1-p_2=0$ is satisfied will be considered blow. In this case, because $p_1=p_2$, the following expression (6) is satisfied.

$$\frac{A_1 \sin\theta[n]}{A_1 \sin\theta[n-1]} = \frac{A_2 \sin(\theta[n]+120)}{A_2 \sin(\theta[n-1]+120)} \quad (6)$$

When this expression is deformed, the following expression (7) can be obtained.

$$\frac{\sin\theta[n-1]}{\sin\theta[n]} \cdot \frac{\sin(\theta[n]+120)}{\sin(\theta[n-1]+120)} = 1 \quad (7)$$

The case where the expression (7) is satisfied is the case where $\theta(n)$ is equal to $\theta(n-1)$, that is, the case where the present rotation angle $\theta(n)$ is equal to the immediately preceding rotation angle $\eta(n-1)$. When the condition that neither $S_1(n)$ nor $S_2(n)$ is zero, the condition that neither the denominator $S_1(n-1)$ of $p_1$ nor the denominator $S_2(n-1)$ of $p_2$ is zero, and the condition that $p_1-p_2=0$ are all satisfied, the immediately preceding computed rotation angle $\theta(n-1)$ is used as the present rotation angle $\theta(n)$.

The third and fourth arithmetic expressions from the top of Table 1 are arithmetic expressions that are used when the denominator $S_1(n-1)$ of $p_1$ is zero. Because $S_1(n-1)=A_1 \sin\theta(n-1)$, $S_1(n-1)=0$ is satisfied when $\sin\theta(n-1)=0$. That is, when $\theta(n-1)$ is 0° or 180°, $S_1(n-1)$ is zero. Because $S_2(n-1)=A_2 \sin(\theta(n-1)+120)$, $S_2(n-1)>0$ is satisfied when $\theta(n-1)$ is 0°, and $S_2(n-1)<0$ is satisfied when $\theta(n-1)$ is 180°. Therefore, $\theta(n-1)=0$ is satisfied when $S_1(n-1)=0$ and $S_2(n-1)>0$, and $\theta(n-1)=180$ is satisfied when $S_1(n-1)=0$ and $S_2(n-1)<0$.

When $\theta(n-1)=0$, the expressions (4c), (4d) are expressed by the following expressions (8c), (8d), respectively.

$$S_2(n)=A_2 \sin(\theta(n)+120) \quad (8c)$$

$$S_2(n-1)=A_2 \sin 120=\sqrt{3}/2 \cdot A_2 \quad (8d)$$

The following expression (9) can be obtained from the expression (8d)

$$A_2=(2/\sqrt{3}) \cdot S_2(n-1) \quad (9)$$

When the expression (9) is substituted into the expression (8c), the following expression (10) can be obtained.

$$\sin(\theta(n)+120)=(\sqrt{3}/2) \cdot (S_2(n)/S_2(n-1)) \quad (10)$$

Therefore, the rotation angle $\theta(n)$ can be computed according to the following expression (11).

$$\theta[n] = \sin^{-1}\left(\frac{\sqrt{3}}{2} \cdot \frac{S_2[n]}{S_2[n-1]}\right) - 120 \quad (11)$$

As shown in the third row from the top of Table 1, when the conditions that neither $S_1(n)$ nor $S_2(n)$ is zero, the denominator $S_2(n-1)$ of $p_2$ is not zero, the denominator $S_1(n-1)$ of $p_1$ is zero, and $S_2(n-1)>0$ are all satisfied, the rotation angle $\theta(n)$ is computed according to the arithmetic expression expressed by the expression (11). On the other hand, when θ(n−1)=180, the expressions (4c), (4d) are expressed by the following expressions (12c), (12d), respectively.

$$S_2(n)=A_2 \sin(\theta(n)+120) \quad (12c)$$

$$S_2(n-1)=A_2 \sin 300=-\sqrt{3}/2 \cdot A_2 \quad (12d)$$

The following expression (13) can be obtained from the expression (12d).

$$A_2=(-2/\sqrt{3}) \cdot S_2(n-1) \quad (13)$$

When the expression (13) is substituted into the expression (12c), the following expression (14) can be obtained.

$$\sin(\theta(n)+120)=(-\sqrt{3}/2) \cdot (S_2(n)/S_2(n-1)) \quad (14)$$

The rotation angle θ(n) can be computed according to the following expression (15).

$$\theta[n] = \sin^{-1}\left(-\frac{\sqrt{3}}{2} \cdot \frac{S_2[n]}{S_2[n-1]}\right) - 120 \quad (15)$$

As shown in the fourth row from the top of Table 1, when the conditions that neither $S_1(n)$ nor $S_2(n)$ is zero, the denominator $S_2(n-1)$ of $p_2$ is not zero, the denominator $S_1(n-1)$ of $p_1$ is zero, and $S_2(n-1)<0$ are all satisfied, the rotation angle θ(n) is computed according to the arithmetic expression expressed by the expression (15). The fifth and sixth arithmetic expressions from the top of Table 1 are arithmetic expressions used when $S_2(n)=0$ is satisfied. Because $S_2(n)=A_2 \sin(\theta(n)+120)$, when $\sin(\theta(n)+120)=0$, $S_2(n)=0$ is satisfied. That is, when θ(n) is −120° or 60°, $S_2(n)=0$ is satisfied. Because $S_1(n)=A_1 \sin \theta(n)$, $S_1(n)<0$ is satisfied when θ(n) is −120°, and $S_1(n)>0$ is satisfied when θ(n)=60°. θ(n)=60 is satisfied when θ(n)=0 and $S_1(n)>0$, and θ(n)=−120 is satisfied when $S_2(n)=0$ and $S_1(n)<0$.

As shown in the fifth row from the top of Table 1, when the conditions that $S_1(n)$ is not zero, the denominator $S_2(n-1)$ of $p_2$ is not zero, $S_2(n)=0$, and $S_1(n)>0$ are all satisfied, the rotation angle θ(n) is computed as 60°. Further, as shown in the sixth row from the top of Table 1, when the conditions that $S_1(n)$ is not zero, the denominator $S_2(n-1)$ of $p_2$ is not zero, $S_2(n)=0$, and $S_1(n)<0$ are all satisfied, the rotation angle θ(n) is computed as −120°.

The seventh and eighth arithmetic expressions from the top of Table 1 are arithmetic expressions used when the denominator $S_2(n-1)$ of $p_2$ is zero. Because $S_2(n-1)=A_2 \sin(\theta(n-1)+120)$, when $\sin(\theta(n-1)+120)=0$, $S_2(n-1)=0$ is satisfied. That is, when θ(n−1) is −120° or 60°, $S_2(n-1)$ is zero. Because $S_1(n-1)=A_1 \sin \theta(n-1)$, $S_1(n-1)<0$ is satisfied when θ(n−1) is −120°, and $S_1(n-1)>0$ is satisfied when θ(n−1) is 60°. Therefore, θ(n−1)=60 is satisfied, when $S_2(n-1)=0$ and $S_1(n-1)>0$, and θ(n−1)=−120 is satisfied when $S_2(n-1)=0$ and $S_1(n-1)<0$.

When θ(n−1)=60, the expressions (4a), (4b) are expressed by the following expressions (16a), (16b), respectively.

$$S_1(n)=A_1 \sin \theta(n) \quad (16a)$$

$$S_1(n-1)=A_1 \sin 60=\sqrt{3}/2 \cdot A_1 \quad (16b)$$

On the basis of the expression (16b), the following expression (17) can be obtained.

$$A_1=(2/\sqrt{3}) \cdot S_1(n-1) \quad (17)$$

When the expression (17) is substituted into the expression (16a), the following expression (18) can be obtained.

$$\sin \theta(n)=(\sqrt{3}/2) \cdot (S_1(n)/S_1(n-1)) \quad (18)$$

Therefore, the rotation angle θ(n) can be computed by the following expression (19).

$$\theta[n] = \sin^{-1}\left(\frac{\sqrt{3}}{2} \cdot \frac{S_1[n]}{S_1[n-1]}\right) \quad (19)$$

As shown in the seventh row from the top of Table 1, when the conditions that $S_1(n)$ is not zero, the denominator $S_2(n-1)$ of $p_2$ is zero, and $S_1(n-1)>0$ are all satisfied, the rotation angle θ(n) is computed according to the arithmetic expression expressed by the expression (19). On the other hand, when θ(n−1)=−120, the expressions (4a), (4b) are expressed by the following expressions (20a), (20b), respectively.

$$S_1(n)=A_1 \sin \theta(n) \quad (20a)$$

$$S_1(n-1)=A_1 \sin(-120)=-\sqrt{3}/2 \cdot A_2 \quad (20b)$$

The following expression (21) can be obtained from the expression (20b).

$$A_1=(-2/\sqrt{3}) \cdot S_1(n-1) \quad (21)$$

When the expression (21) is substituted into the expression (20a), the following expression (22) can be obtained.

$$\sin \theta(n)=(-\sqrt{3}/2) \cdot (S_1(n)/S_1(n-1)) \quad (22)$$

Therefore, the rotation angle θ(n) can be computed according to the following expression (23).

$$\theta[n] = \sin^{-1}\left(-\frac{\sqrt{3}}{2} \cdot \frac{S_1[n]}{S_1[n-1]}\right) \quad (23)$$

As expressed by the eighth row from the top of Table 1, when the conditions that $S_1(n)$ is not zero, the denominator $S_2(n-1)$ of $p_2$ is zero, and $S_1(n-1)<0$ are all satisfied, the rotation angle θ(n) is computed according to an arithmetic expression expressed by the expression (23). The ninth and tenth arithmetic expressions from the top of Table 1 are arithmetic expressions that are used when $S_1(n)=0$ is satisfied. Because $S_1(n)=A_1 \sin \theta(n)$, when $\sin \theta(n)=0$, $S_1(n)=0$ is satisfied. That is, when θ(n) is 0° or 180°, $S_1(n)=0$ is satisfied. Because $S_2(n)=A_2 \sin(\theta(n)+120)$, $S_2(n)>0$ is satisfied when θ(n) is 0°, and $S_2(n)<0$ is satisfied when θ(n) is 180°. Therefore, θ(n)=0 is satisfied when $S_1(n)=0$ and $S_2(n)>0$, and θ(n)=180 is satisfied when $S_1(n)=0$ and $S_2(n)<0$.

As shown in the ninth row from the top of Table 1, when the conditions that $S_1(n)$ is zero and $S_2(n)>0$ are both satisfied, the rotation angle θ(n) is computed as 0°. Further, as shown in the tenth row from the top of Table 1, when the conditions that $S_1(n)$ is zero and $S_2(n)>0$ are both satisfied, the rotation angle is computed as 180°. According to the first computing method, because the rotation angle θ(n) of the input shaft 8 is computed on the basis of the output signals from the two magnetic sensors 71, 72, which are sampled at two sampling timings, the highly accurate rotation angle can be computed. Furthermore, according to the first computing method, even if the number of expressions used to compute the rotation angle θ(n) of the input shaft 8 is smaller than the number of unknown quantities originally included in these expressions, the rotation angle θ(n) of the input shaft 8 can be computed. As a result, the number of sensor values required to compute the rotation angle θ(n) of the input shaft 8 can be reduced.

According to the first computing method, by setting a short sampling period, the amplitudes ($A_1(n)$ and $A_1(n-1)$; $A_2(n)$ and $A_2(n-1)$) of the output signals from the same magnetic sensor at the two sampling timings are assumed to be equal to each other. The amplitudes of the output signals from the same magnetic sensor at two sampling timings may be different values due to the influence of temperature changes. However, if the sampling interval is short, a temperature change between the two sampling timings is considerably small. Therefore, the amplitudes of the output signals from the same magnetic sensor at the two sampling timings may be assumed to be equal to each other. In the first computing method, variations of amplitudes due the influence of temperature changes between the two sampling timings can be compensated for. In the first computing method, because the amplitudes $A_1$, $A_2$ of the output signals from the magnetic sensors 71, 72 are regarded as different unknown quantities, the influence of variations of temperature characteristics between the magnetic sensors 71, 72 can be compensated for. As a result, the highly accurate rotation angle can be detected.

A basic concept of the second computing method will be described below. A phase difference (electrical angle) between the first output signal $S_1$ and the second output signal $S_2$ will be denoted by C. The number of the present sampling period (the number of the present computation period) will be denoted by (n), the number of the immediately preceding sampling period will be denoted by (n−1), and the number of the second preceding sampling period will be denoted by (n−2). A correction value used to correct a rotation angle computing error due to the variations of angular widths (magnetic pole widths) of the magnetic poles M1 to M8 will be referred, to as an angular width error correction value (magnetic pole width error correction value), and will be denoted by E.

When the phase difference C, the numbers of the sampling periods (n), (n−1), (n−2), and the angular width error correction value E are used, the first output signals $S_1$ sampled in the present sampling period, the immediately preceding sampling period, and the second preceding sampling period, and the second, output signals $S_2$ sampled in the present sampling period, the immediately preceding sampling period, and the second preceding sampling period can be expressed by the following expressions (24a), (24b), (24c), (24d), (24e), (24f), respectively.

$$S_1(n)=A_1(n)\sin(E_1(n)\theta(n)) \qquad (24a)$$

$$S_1(n-1)=A_1(n-1)\sin(E_1(n-1)\theta(n-1)) \qquad (24b)$$

$$S_1(n-2)=A_1(n-2)\sin(E_1(n-2)\theta(n-2)) \qquad (24c)$$

$$S_2(n)=A_2(n)\sin(E_2(n)\theta(n)+C) \qquad (24d)$$

$$S_2(n-1)=A_2(n-1)\sin(E_2(n-1)\theta(n-1)+C) \qquad (24e)$$

$$S_2(n-2)=A_2(n-2)\sin(E_2(n-2)\theta(n-2)+C) \qquad (24f)$$

In the expressions (24a) to (24f), $E_1(x)$ is an angular width error correction value corresponding to a magnetic pole sensed by the first magnetic sensor 71 in an λ-th computation period. $E_2(x)$ is an angular width error correction value corresponding to a magnetic pole sensed by the second magnetic sensor 72 in an x-th computation period.

The number of magnetic poles of the magnet 61 will be denoted by m. Furthermore, a natural number from 1 to m, which is used to relatively identify each magnetic pole, will be denoted by i. When an angular width of a given magnetic pole is denoted by w(i) (electrical angle) and an angular width error of the given magnetic pole is denoted by $\theta_{err}(i)$ (electrical angle), $\theta_{err}(i)$ is expressed by the following expression (25).

$$\theta_{err}(i)=w(i)-180 \qquad (25)$$

When the angular width error correction value for the given magnetic pole is denoted by E(i), E(i) is defined by the following expression (26).

$$\begin{aligned} E(i) &= 180/w(i) \\ &= 180/(\theta_{err}(i)+180) \end{aligned} \qquad (26)$$

The angular width error correction value E(i) for each magnetic pole is information regarding a pitch width of the magnetic pole. Note that the information regarding the pitch width of each magnetic pole may be an angular width w(i) of the magnetic pole or an angular width error $\theta_{err}(i)$ of the magnetic pole.

If C is a known quantity, the number of unknown quantities included in the six expressions expressed by the expressions (24a) to (24f) is 16. That is, because the number of the unknown quantities is greater than the number of the expressions, simultaneous equations constituted of the six expressions cannot be solved in this state. Therefore, by setting a short sampling interval (sampling period), variations of amplitudes due to temperature changes between three sampling timings are assumed to be non-existent. That is, on the assumption that amplitudes $A_1(n)$, $A_1(n-1)$ $A_1(n-2)$ of the output signals from the first magnetic sensor 71, which are sampled at three sampling timings, are equal to each other, the amplitudes $A_1(n)$, $A_1(n-1)$, $A_1(n-2)$ are expressed by $A_1$. Similarly, on the assumption that amplitudes $A_2(n)$, $A_2(n-1)$, $A_2(n-2)$ of the output signals from the second magnetic sensor 72, which are sampled at three sampling timings, are equal to each other, the amplitudes $A_2(n)$, $A_2(n-1)$, $A_2(n-2)$ are expressed by $A_2$.

Further, both the magnetic sensors 71, 72 are assumed to sense one and the same magnetic pole at three sampling timings. That is, all the angular width error correction values $E_1(n)$, $E_1(n-1)$, $E_1(n-2)$, $E_2(n)$, $E_2(n-1)$, $E_2(n-2)$ included in the output signals from the magnetic sensors 71, 72, which are sampled at the three sampling timings, are assumed to be angular width error correction values for one and the same magnetic pole, and they will be denoted by E(i). Thus, the expressions (24a) to (24f) can be expressed by the following expressions (27a) to (27f), respectively.

$$S_1(n)=A_1\sin(E(i)\cdot\theta(n)) \qquad (27a)$$

$$S_1(n-1)=A_1\sin(E(i)\cdot\theta(n-1)) \qquad (27b)$$

$$S_1(n-2)=A_1\sin(E(i)\cdot\theta(n-2)) \qquad (27c)$$

$$S_2(n)=A_2\sin(E(i)\cdot\theta(n)+C) \qquad (27d)$$

$$S_2(n-1)=A_2\sin(E(i)\cdot\theta(n-1)+C) \qquad (27e)$$

$$S_2(n-2)=A_2\sin(E(i)\cdot\theta(n-2)+C) \qquad (27f)$$

The number of unknown quantities ($A_1$, $A_2$, E(i), $\theta(n)$, $\theta(n-1)$, $\theta(n-2)$) included in the six expressions is six. That is, the number of the unknown quantities is equal to or smaller than the number of the expressions, and hence simultaneous equations constituted of the six expressions can be solved. Therefore, by solving the simultaneous equations constituted of the six expressions (27a) to (27f), the rotation angle $\theta(n)$ of the input shaft 8 can be computed.

Hereinafter, the case where the phase difference C between the sinusoidal signals output from the magnetic sensors 71, 72 is 120° will be described in detail. When the phase difference C is 120°, the six expressions (27a) to (27f) can be expressed by the following expressions (28a) to (28f), respectively.

$$S_1(n) = A_1 \sin(E(n) \cdot \theta(n)) \quad (28a)$$

$$S_2(n-1) = A_1 \sin(E(i) \cdot \theta(n-1)) \quad (28b)$$

$$S_1(n-2) = A_1 \sin(E(i) \cdot \theta(n-2)) \quad (28c)$$

$$S_2(n) = A_2 \sin(E(i) \cdot \theta(n) + 120) \quad (28d)$$

$$S_2(n-1) = A_2 \sin(E(i) \cdot \theta(n-1) + 120) \quad (28e)$$

$$S_2(n-2) = A_2 \sin(E(i) \cdot \theta(n-2) + 120) \quad (28f)$$

According to the basic expression (5), $E(i) \cdot \theta(n)$ is expressed by the following expression (29).

$$E(i) \cdot \theta[n] = \frac{1}{4} \cos^{-1}\left(1 - \frac{(3p_1^2 p_2^2 - 2p_1^2 - 2p_2^2 + p_1 p_2)^2}{2(p_1 - p_2)^2(p_1^2 + p_1 p_2 + p_2^2)}\right) - \frac{1}{4} \cos^{-1}\left(\frac{1}{2} - \frac{3}{2} \cdot \frac{p_1 p_2 + p_2^2}{p_1^2 + p_1 p_2 + p_2^2}\right) \quad (29)$$

where $$p_1 = \frac{S_1[n]}{S_1[n-1]}$$

$$p_2 = \frac{S_2[n]}{S_2[n-1]}$$

Furthermore, by solving simultaneous equations constituted of the six expressions (28a) to (28f), the angular width error correction value E(i) can be expressed by the following expression (30).

$$E = \frac{1}{240} \cdot \cos^{-1}\left(\frac{q_1^2 t^2 - 2q_1 q_2 t + q_2^2}{2t(S_1[n]S_2[n] - S_1[n-1]S_2[n-1])^2} - 1\right) \quad (30)$$

where $$q_1 = S_1[n-1]^2 - S_1[n]^2$$

$$q_2 = S_2[n]^2 - S_2[n-1]^2$$

$$t = \frac{S_1[n]S_2[n]q_3 + S_1[n-1]S_2[n-1]q_4 + S_1[n-2]S_2[n-2]q_1}{S_1[n]S_2[n]q_5 + S_1[n-1]S_2[n-1]q_6 + S_1[n-2]S_2[n-2]q_2}$$

$$q_3 = S_1[n-2]^2 - S_1[n-1]^2$$

$$q_4 = S_1[n]^2 - S_1[n-2]^2$$

$$q_5 = S_2[n-1]^2 - S_2[n-2]^2$$

$$q_6 = S_2[n-2]^2 - S_2[n]^2$$

By dividing $E(i) \cdot \theta(n)$ computed from the expression (29) by the angular width error correction value E(i) obtained from the expression (30), $\theta(n)$ can be obtained. That is, $\theta(n)$ can be obtained according to the following expression (31).

$$\theta(n) = E(i) \cdot \theta(n) / E \quad (31)$$

Note that, $E(i) \cdot \theta(n)$ is computed according to the arithmetic expression corresponding to the conditions according to Table 1. Further, when at least one of the denominators of the fractions included in the expression (30) is zero, the angular width error correction value E(i) cannot be computed according to the expression (30). Therefore, in the present embodiment, when at least one of the denominators of the fractions included in the expression (30) is zero, the immediately preceding computed angular width error correction value E(i) is used as the present angular width error correction value E(i).

Note that the case where at least one of the denominators of the fractions included in the expression (30) is zero is the case where at least one of the three conditions expressed, by the following expressions (32), (33), (34) is satisfied.

$$S_1[n]S_2[n] - S_1[n-1]S_2[n-1] = 0 \quad (32)$$

$$S_1[n]S_2[n]q_3 + S_1[n-1]S_2[n-1]q_4 + S_1[n-2]S_2[n-2]q_1 = 0 \quad (33)$$

$$S_1[n]S_2[n]q_5 + S_1[n-1]S_2[n-1]q_6 + S_1[n-2]S_2[n-2]q_2 = 0 \quad (34)$$

$$q_1 = S_1[n-1]^2 - S_1[n]^2$$

$$q_2 = S_2[n]^2 - S_2[n-1]^2$$

$$q_3 = S_1[n-2]^2 - S_1[n-1]^2$$

$$q_4 = S_1[n]^2 - S_1[n-2]^2$$

$$q_5 = S_2[n-1]^2 - S_2[n-2]^2$$

$$q_6 = S_2[n-2]^2 - S_2[n]^2$$

According to the second computing method, because the rotation angle $\theta(n)$ of the input shaft 8 is computed on the basis of the output signals from the two magnetic sensors 71, 72, which are sampled at three sampling timings, the highly accurate rotation angle can be computed. In the second computing method, even if the number of expressions used to compute the rotation angle $\theta(n)$ of the input shaft 8 is smaller than the number of unknown quantities originally included in these expressions, the rotation angle $\theta(n)$ of the input shaft 8 can be computed, and hence the number of sensor values required to compute the rotation angle $\theta(n)$ of the input shaft 8 can be reduced.

According to the second computing method, the amplitudes ($A_1(n)$, $A_1(n-1)$ and $A_1(n-2)$; $A_2(n)$, $A_2(n-1)$ and $A_2(n-2)$) of the output signals from the same magnetic sensor, which are sampled at the three sampling timings, are assumed to be equal to each other. The amplitudes of the output signals from the same magnetic sensor, which are sampled at three sampling timings, may be different values due to the influence of temperature changes. However, if the sampling interval is short, a temperature change between the three sampling timings is considerably small. Therefore, the amplitudes of the output signals from the same magnetic sensor, which are sampled at the three sampling timings, may be assumed to be equal to each other. Therefore, in the second computing method, variations of amplitudes due the influence of temperature changes between the three sampling timings can be compensated for. In the second computing method, because the amplitudes $A_1$, $A_2$ of the output, signals from the magnetic sensors 71, 72 are regarded as different unknown quantities, the influence of variations of temperature characteristics between the magnetic sensors 71, 72 can be compensated for. As a result, the highly accurate rotation angle can be detected.

In the second computing method, all the angular width error correction values E(i) included in the six expressions used to compute the rotation angle $\theta(n)$ are assumed to be equal to each other. The angular width error correction value E(i) varies from one magnetic pole to another. Therefore, the angular width error correction values E(i) included in the expressions that express the six output signals $S_1(n)$, $S_1(n-1)$, $S_1(n-2)$, $S_2(n)$, $S_2(n-1)$, $S_2(n-2)$ used to compute the rotation angle $\theta(n)$ do not always take the same value. However, when the two magnetic sensors 71, 72 sense one and the same magnetic pole at three sampling timings, all the angular width error correction values E(i) included in the expressions that express the output signals take the same value. Therefore, in the second computing method, when the two magnetic sensors 71, 72 sense one and the same magnetic pole at three sampling timings, variations of angular widths (pitch widths) of the magnetic poles M1 to M8 of the magnet 61 can be compensated for. As a result, the highly accurate rotation angle can be detected.

Figure 8:
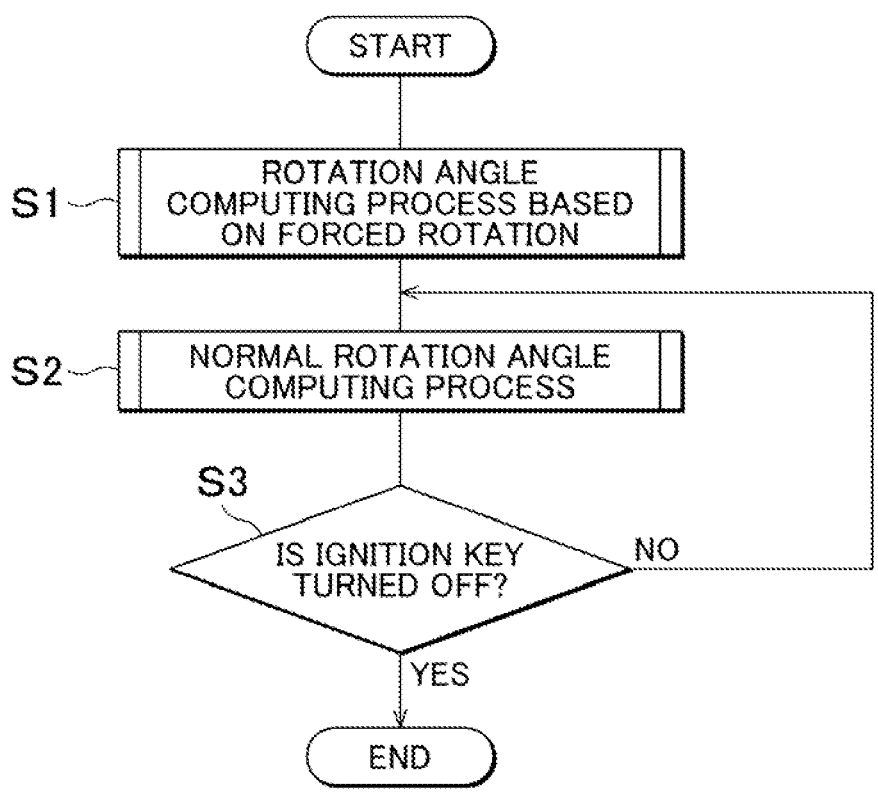
FIG. 8 is a flowchart showing the operation of a first rotation angle computation unit.

FIG. 8 is a flowchart showing the operation of the first rotation angle computation unit 77A. When a power supply for the torque computation ECU 77 is turned on, the first rotation angle computation unit 77A executes a rotation angle computing process based on forced rotation (step S1). In this process, the electric motor 18 is forced to rotate temporarily to rotate the input shaft 8 (the output shaft 9), and the rotation angle $\theta$ of the input shaft 8 is computed. Details of the process will be described later.

In the first computing method and the second computing method described above, if the output signals $S_1$, $S_2$ from the respective magnetic sensors 71, 72 are not changed between the immediately preceding sampling timing and the present, sampling timing, $p_1=p_2$ is satisfied, and hence the immediately preceding computed rotation angle $\theta(n)$ is used as the rotation angle $\theta(n)$ (see the second arithmetic expression from the top of Table 1). However, at the time when the power supply for the torque computation ECU 77 is turned on by turning on the ignition key, there is no immediately preceding computed rotation angle $\theta(n)$. Therefore, if the output signals $S_1$, $S_2$ from the respective magnetic sensors 71, 72 do not change after the power supply for the torque computation ECU 77 is turned on, the rotation angle $\theta(n)$ cannot be computed. Therefore, in order to create an immediately preceding value of the rotation angle $\theta(n)$, the rotation angle computing process based on forced rotation is executed.

When the rotation angle computing process based on forced rotation ends, the first rotation angle computation unit 77A executes a normal rotation angle computing process (step S2). Details of the process will be described later. The normal rotation angle computing process is continuously executed until the ignition key is turned off. When the ignition key is turned off (YES in step S3), the first rotation angle computation unit 77A ends the normal rotation angle computing process.

Figure 9:
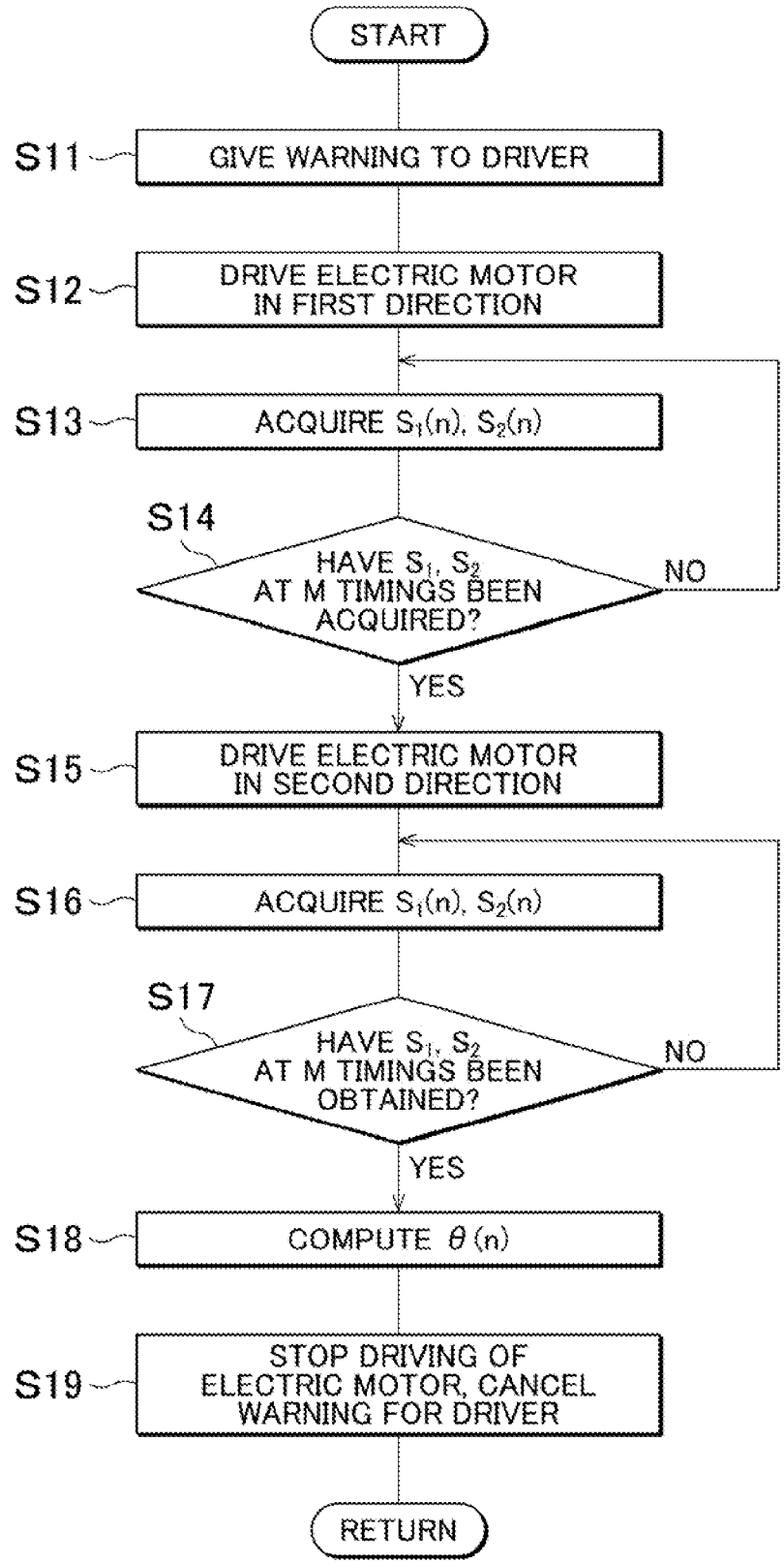
FIG. 9 is a flowchart showing the procedure of a rotation angle computing process based on forced rotation in step S1 in FIG. 8.

FIG. 9 is a flowchart, showing the procedure of the rotation angle computing process based on forced rotation in step S1 in FIG. 8. In the rotation angle computing process based on forced rotation, the steering wheel 2 automatically rotates for a short time. Therefore, there is a possibility that a driver will erroneously recognize that a failure has occurred. Thus, the first rotation angle computation unit 77A gives the driver a warning to avoid an erroneous recognition (step S11). Specifically, the first rotation angle computation unit 77A transmits a warning output command to an image-voice control unit (not illustrated) used to control, for example, a display unit (not illustrated), and a voice output device (not illustrated) arranged in the vehicle. Upon reception of the warning output command, the image-voice control, unit causes the display unit to display a message "STEERING WHEEL IS FORCEDLY ROTATED, BUT THERE IS NO FAILURE", or causes the voice output device to output the message.

Then, the first rotation angle computation unit 77A drives the electric motor 18 to rotate the electric motor 18 in a first direction (step S12). Specifically, the first rotation angle computation unit 77A transmits, to the motor control ECU 12, a first forced rotation command according to which the electric motor 18 is driven to be rotated in the first direction. Upon reception of the first forced rotation command, the motor control ECU 12 drives the electric motor 18 to rotate the electric motor 18 in the first direction.

The first rotation angle computation unit 77A obtains sensor values $S_1(n)$, $S_2(n)$ from the respective magnetic sensors 71, 72 (step S13). A memory in the torque computation ECU 77 stores sensor values obtained at least at three timings. That is, the memory in the torque computation ECU 77 stores the sensor values from the sensor value obtained M-th preceding timing (M is a prescribed value) to the sensor value obtained most recently. After the electric motor 18 is driven to be rotated in the first direction, the first rotation angle computation unit 77A determines whether the sensor values $S_1$, $S_2$ at M timings have been obtained (step S14). When the rotation angle $\theta(n)$ of the input shaft 8 is computed in step S18 (described later) according to the first computing method, M is set to 2. When the rotation angle $\theta(n)$ of the input shaft 8 is computed in step S18 according to the second computing method, M is set to 3.

When the sensor values $S_1$, $S_2$ at M timings have not been obtained (NO in step S14), the first rotation angle computation unit 77A returns to step S13 and obtains the sensor values $S_1(n)$, $S_2(n)$. The sampling period for sampling the sensor values $S_1(n)$, $S_2(n)$ in the case where the process in step S13 is repeated is determined in advance. When it is determined in step S14 that the sensor values $S_1$, $S_2$ at M timings have been obtained (YES in step S14), the first rotation angle computation unit 77A drives the electric motor 18 to rotate the electric motor 18 in a second direction that is the opposite direction of the first direction (step S15). Specifically, the first rotation angle computation unit 77A transmits, to the motor control ECU 12, a second forced rotation command according to which the electric motor 18 is driven to be rotated in the second direction. Upon reception of the second forced rotation command, the motor control ECU 12 drives the electric motor 18 to rotate the electric motor 18 in the second direction.

Then, the first rotation angle computation unit 77A obtains sensor values $S_1(n)$, $S_2(n)$ from the respective magnetic sensors 71, 72 (step S16). After the electric motor 18 is driven to be rotated in the second direction, the first rotation angle computation unit 77A determines whether the sensor values $S_1$, $S_2$ at M timings have been obtained (step S17). When the sensor values $S_1$, $S_2$ at M timings have not been obtained (NO in step S14), the first rotation angle computation unit 77A returns to step S16, and obtains the sensor values $S_1(n)$, $S_2(n)$. The sampling period for sampling the sensor values $S_1(n)$, $S_2(n)$ in the case where the process in step S16 is repeated is determined in advance.

When it is determined in step S17 that the sensor values $S_1$, $S_2$ at M timings have been obtained (YES in step S17), the first rotation angle computation unit 77A computes the rotation angle $\theta(n)$ of the input shaft 8 on the basis of the sensor values $S_1$, $S_2$ obtained at M timings and stores the computed rotation angle $\theta(n)$ (step S18). Note that the memory stores the most recent sensor values $S_1$, $S_2$ obtained at M timings. When M is set to 2, the first rotation angle computation unit 77A computes the rotation angle $\theta(n)$ of the input shaft 8 according to the first computing method. On the other hand, when M is set to 3, the first rotation, angle computation unit 77A computes the rotation angle θ(n) of the input shaft 8 according to the second computing method.

Then, the first rotation angle computation unit 77A stops driving of the electric motor 18 and cancels the warning for the driver (step S19). Specifically, the first rotation angle computation unit 77A transmits a driving stop command for the electric motor 18 to the motor control ECU 12, and also transmits a warning cancellation command to the image-voice control unit. Upon reception of the driving stop command for the electric motor 18, the motor control ECU 12 stops driving of the electric motor 18. Upon reception of the warning cancellation command, the image-voice control unit cancels the warning display, the warning voice output, or the like. Thus, the rotation angle computing process based on forced rotation ends.

Figure 10:
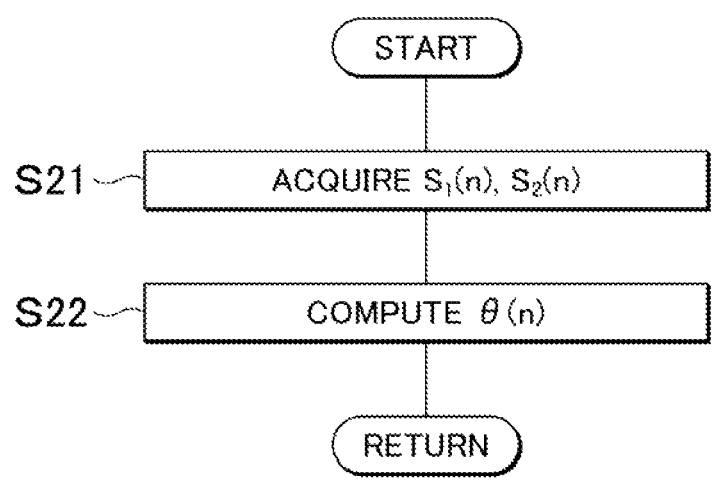
FIG. 10 is a flowchart showing the procedure of a normal rotation angle computing process in step S2 in FIG. 8.

FIG. 10 is a flowchart showing the procedure of the normal rotation angle computing process in step S2 in FIG. 8. The process in FIG. 10 is repeatedly executed with a predetermined computation period (sampling period). The first rotation angle computation unit 77A obtains the sensor values $S_1(n)$, $S_2(n)$ (step S21). The first rotation angle computation unit 77A computes the rotation angle θ(n) of the input shaft 8 on the basis of the most recent sensor values $S_1$, $S_2$ obtained at M timings, including the presently obtained sensor values $S_1(n)$, $S_2(n)$ (step S22). When M is set to 2, the first rotation angle computation unit 77A computes the rotation angle θ(n) of the input shaft 8 according to the first computing method. On the other hand, when M is set to 3, the first rotation angle computation unit 77A computes the rotation angle θ(n) of the input shaft 8 according to the second computing method.

The sensor values $S_1(n-1)$, $S_2(n-1)$ obtained at immediately preceding timing and the rotation angle θ(n−1) computed at immediately preceding timing are stored as the sensor values $S_1(n-2)$, $S_2(n-2)$ obtained at second immediately preceding timing and the rotation angle θ(n−2) computed at second immediately preceding timing, respectively. The presently obtained sensor values $S_1(n)$, $S_2(n)$ and the presently computed rotation angle θ(n) are stored as the sensor values $S_1(n-1)$, $S_2(n-2)$ obtained at immediately preceding timing and the rotation angle θ(n−1) computed at immediately preceding timing, respectively.

The operation of the first phase difference computation unit 77D and the operation of the second phase difference computation unit 77E will be described. Because the operation of the second phase difference computation unit 77E is the same as the operation of the first phase difference computation unit 77D, only the operation of the first phase difference computation unit 77D will be described. First, a concept of a method of computing the phase difference with the use of the first phase difference computation unit 77D will be described. As explained above in the description on the second computing method, the output signals from the two magnetic sensors 71, 72, which, are sampled at three samplings, are expressed by the expressions (24a) to (24f).

$$S_1(n) = A_1(n)\sin(E_1(n)\theta(n)) \tag{24a}$$

$$S_1(n-1) = A_1(n-1)\sin(E_1(n-1)\theta(n-1)) \tag{24b}$$

$$S_1(n-2) = A_1(n-2)\sin(E_1(n-2)\theta(n-2)) \tag{24c}$$

$$S_2(n) = A_2(n)\sin(E_2(n)\theta(n)+C) \tag{24d}$$

$$S_2(n-1) = A_2(n-1)\sin(E_2(n-1)\theta(n-1)+C) \tag{24e}$$

$$S_2(n-2) = A_2(n-2)\sin(E(n-2)\theta(n-2)+C) \tag{24f}$$

If the assumption is made that there are no variations of the amplitude due to temperature changes between the three sampling timings by setting a short sampling interval and the assumption Is made that both the magnetic sensors 71, 72 sense one and the same magnetic pole at the three sampling timings, the expressions (24a) to (24f) are represented by the expressions (27a) to (27f).

$$S_1(n) = A_1 \sin(E(i)\theta(n)) \tag{27a}$$

$$S_1(n-1) = A_1 \sin(E(i)\cdot\theta(n-1)) \tag{27b}$$

$$S_1(n-2) = A_1 \sin(E(i)\cdot\theta(n-2)) \tag{27c}$$

$$S_2(n) = A_2 \sin(E(i)\cdot\theta(n)+C) \tag{27d}$$

$$S_2(n-1) = A_2 \sin(E(i)\cdot\theta(n-1)+C) \tag{27e}$$

$$S_2(n-2) = A_2 \sin(E(i)\cdot\theta(n-2)+C) \tag{27f}$$

An arithmetic expression used to obtain E(i)·C can be derived from these six expressions. The arithmetic expression used to obtain E(i)·C is the following expression (35).

$$E(i) \cdot C = \frac{1}{2} \cdot \cos^{-1}\left(\frac{q_1^2 \cdot t^2 - 2q_1 q_2 t + q_2^2}{2t(S_1[n]S_2[n] - S_1[n-1]S_2[n-1])^2} - 1\right) \tag{35}$$

where $$q_1 = S_1[n-1]^2 - S_1[n]^2$$

$$q_2 = S_2[n]^2 - S_2[n-1]^2$$

$$t = \frac{S_1[n]S_2[n]q_3 + S_1[n-1]S_2[n-1]q_4 + S_1[n-2]S_2[n-2]q_1}{S_1[n]S_2[n]q_5 + S_1[n-1]S_2[n-1]q_6 + S_1[n-2]S_2[n-2]q_2}$$

$$q_3 = S_1[n-2]^2 - S_1[n-1]^2$$

$$q_4 = S_1[n]^2 - S_1[n-2]^2$$

$$q_5 = S_2[n-1]^2 - S_2[n-2]^2$$

$$q_6 = S_2[n-2]^2 - S_2[n]^2$$

Because the sum of variations $\theta_{err}(i)$ of the pitch widths of all the magnetic poles is zero, the following expression (36) is satisfied.

$$\sum_{i=1}^{m} \theta err(i) = 0 \tag{36}$$

As described above, m is the number of the magnetic poles incorporated in the magnet 61. When the expression (26) is deformed, $\theta_{err}(i) = 180/E(i) - 180$ is satisfied. When this expression is substituted into the expression (36), the following expression (37) is derived.

$$\sum_{i=1}^{m}\left(\frac{180}{E(i)} - 180\right) = 0 \tag{37}$$

When the expression (37) is deformed, the following expression (38) can be obtained.

$$\sum_{i=1}^{m} \frac{180}{E(i)} = 180m \quad (38)$$

When the expression (38) is further deformed, the following expression (39) can be obtained.

$$\sum_{i=1}^{m} \frac{1}{E(i)} = m \quad (39)$$

When both sides of the expression (39) are divided by C, the following expression (40) is derived.

$$\sum_{i=1}^{m} \frac{1}{E(i) \cdot C} = \frac{m}{C} \quad (40)$$

Therefore, C is expressed by the following expression (41).

$$C = \frac{m}{\sum_{i=1}^{m} E(i) \cdot C} \quad (41)$$

That is, when the input shaft 8 is rotating, the first phase difference computation unit 77D computes a value of $E(i) \cdot C$ corresponding to one and the same given magnetic pole with the use of six output signals sampled at three different timings while both the magnetic sensors 71, 72 are sensing the given magnetic pole. The first phase difference computation unit 77D executes this process until values of $E(i) \cdot C$ corresponding to all the respective magnetic poles are computed. When the values of $E(i) \cdot C$ corresponding to all the respective magnetic poles are computed, the first phase difference computation unit 77D computes the phase difference C between the output signals $S_1$, $S_2$ with the use of the values of $E(i) \cdot C$ corresponding to all the magnetic poles and the expression (41). In order to compute the phase difference C, the input shaft 8 needs to be rotated, but the input shaft 8 need not be rotated at a uniform velocity. Therefore, a special device for rotating the input shaft 8 at a uniform velocity is not required.

When at least one of the denominators of the tractions included in the expression (35) used to compute $E(i) \cdot C$ is zero, $E(i) \cdot C$ cannot be computed according to the expression (35). That is, when any one of the following expressions (42), (43), (44) is satisfied, $E(i) \cdot C$ cannot be computed according to the expression (35). Thus, when any one of the following expressions (42), (43), (44) is satisfied, the first phase difference computation unit 77D does not compute $E(i) \cdot C$.

$$S_1[n]S_2[n]-S_1[n-1]S_2[n-1]=0 \quad (42)$$

$$S_1[n]S_2[n]q_3+S_1[n-1]S_2[n-1]q_4+S_1[n-2]S_2[n-2]q_1=0 \quad (43)$$

$$S_1[n]S_2[n]q_5+S_1[n-1]S_2[n-1]q_6+S_1[n-2]S_2[n-2]q_2=0 \quad (44)$$

where $$q_1=S_1[n-1]^2-S_1[n]^2$$

$$q_2=S_2[n]^2-S_2[n-1]^2$$

$$q_3=S_1[n-2]^2-S_1[n-1]^2$$

$$q_4=S_1[n]^2-S_1[n-2]^2$$

$$q_5=S_2[n-1]^2-S_2[n-2]^2$$

$$q_6=S_2[n-2]^2-S_2[n]^2$$

Figure 11A:
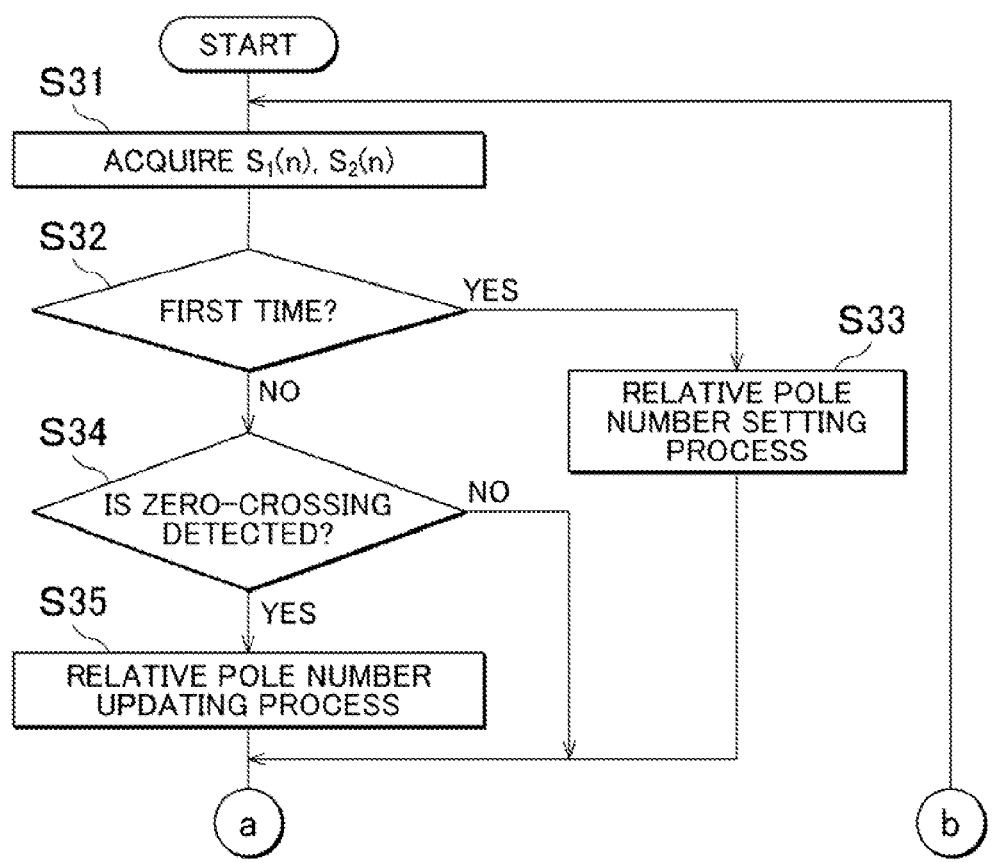
FIG. 11A is a flowchart showing a part of the procedure of a phase difference computing process executed by a first phase difference computation unit.
Figure 11B:
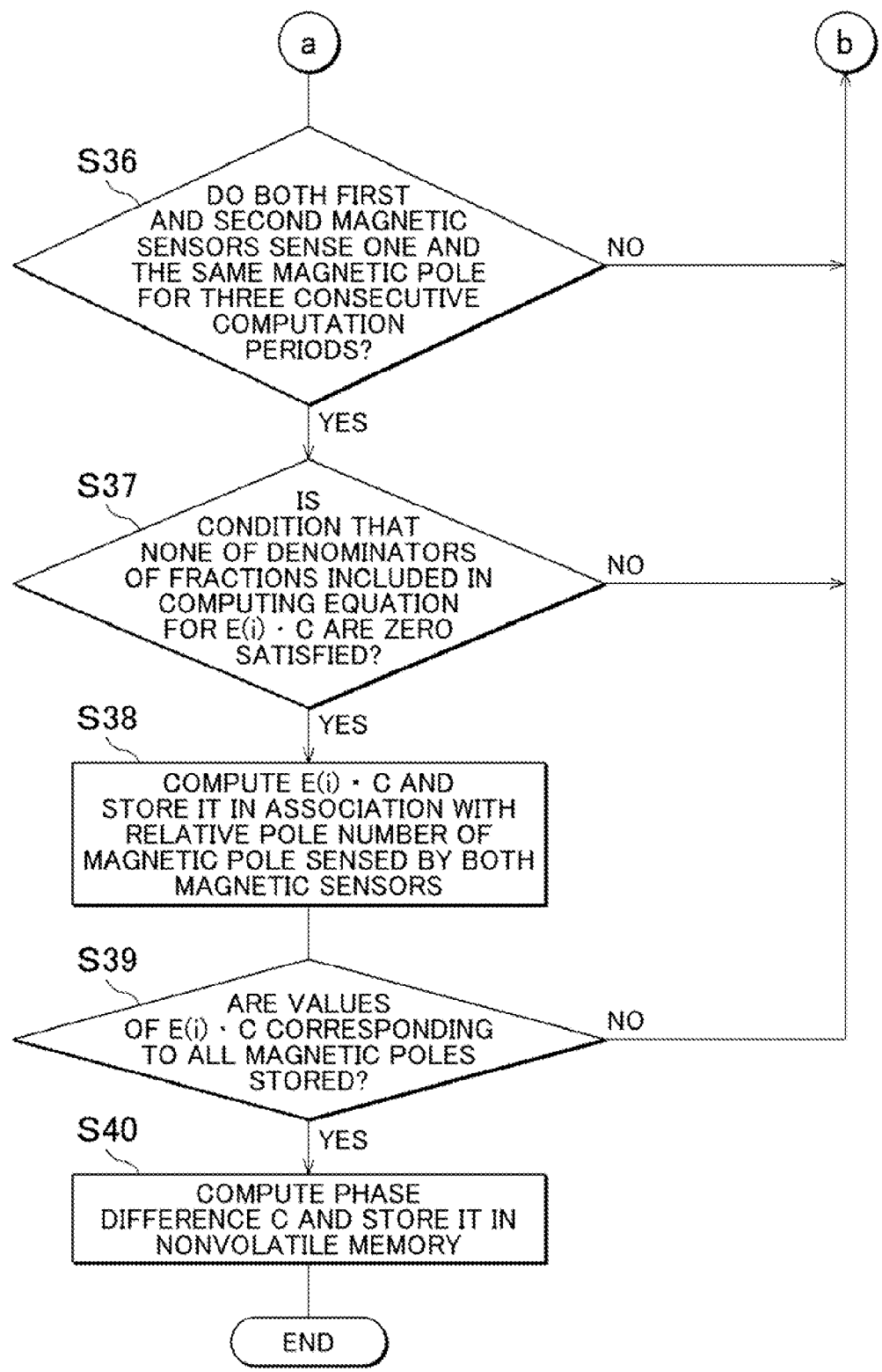
FIG. 11B is a flowchart showing the remaining part of the procedure of a phase difference computing process executed by a first phase difference computation unit.

FIG. 11A and FIG. 11B is a flowchart showing the procedure of a phase difference computing process executed by the first phase difference computation unit 77D. The phase difference computing process is executed when the operation mode of the torque computation ECU 77 is set to the phase difference computing mode by a specific operator or the like. After setting the operation mode of the torque computation ECU 77 to the phase difference computing mode, the operator or the like manually rotates the steering wheel 2 during a prescribed period.

The numbers assigned to the magnetic poles, as relative numbers, using the magnetic pole sensed by the first magnetic sensor 71 at the start of the phase difference computing process as a reference magnetic pole are defined as relative pole numbers. The relative pole number of a magnetic pole sensed by the first magnetic sensor 71 (hereinafter, referred to as "first relative pole number") is expressed by a variable r1, and the relative magnetic pole number of a magnetic pole sensed by the second magnetic sensor 72 (hereinafter, referred to as "second relative pole number") is expressed by a variable r2. Each of the relative pole numbers r1, r2 takes an integer from one to eight, the relative pole number that is smaller than one by one is eight, and the relative pole number that is greater than eight by one is one. In the present embodiment, when the magnetic pole (the reference magnetic pole) sensed by the first magnetic sensor 71 at the start of the phase difference computing process is a north pole, a relative pole number of "1" is assigned to the magnetic pole. On the other hand, when the magnetic pole (the reference magnetic pole) sensed by the first magnetic sensor 71 at the start of the phase difference computing process is a south pole, a relative pole number of "2" is assigned to the magnetic pole.

As illustrated in FIG. 12, in the memory of the torque computation ECU 77, there are provided an area e1 where the values of $E(i) \cdot C$ are stored in association with the relative magnetic pole numbers 1 to 8, an area e2 where the first relative pole numbers r1(n-k) to r1(n) for multiple computation periods are stored, an area e3 where the second relative pole numbers r2(n-k) to r2(n) for multiple computation periods are stored, and the like. Here, k is a natural number equal to or greater than three.

As shown in FIG. 11A and FIG. 11B, when the operation mode is set to the phase difference computing mode, the first phase difference computation unit 77D obtains the sensor values $S_1(n)$, $S_2(n)$ from the respective magnetic sensors 71, 72 (step S31). The process in step S31 is repeatedly executed with a predetermined computation period until the values of $E(i) \cdot C$ corresponding to all the magnetic poles are computed. The memory in the steering torque computation ECU 77 is configured to store sensor values at least at three timings from the n-th preceding timing (n is a prescribed value) to the most recent timing.

The first phase difference computation unit 77D determines whether the present process is the first process after the start of the phase difference computing process (step S32). If the present process is the first process after the start of the phase difference computing process (YES in step S32), the first phase difference computation unit 77D executes a relative pole number setting process (step S33).

Figure 13:
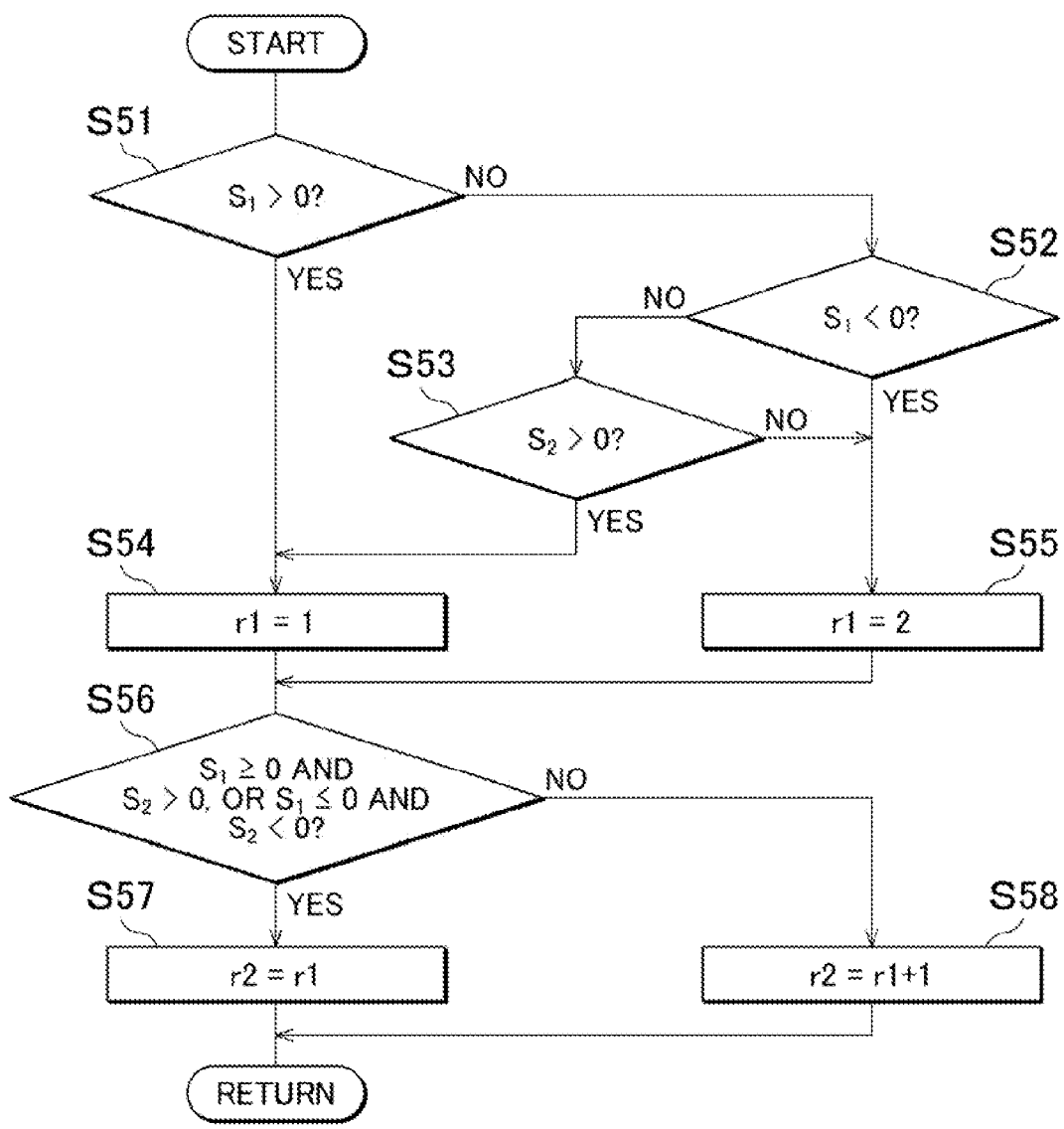
FIG. 13 is a flowchart showing the detailed procedure of a relative pole number setting process.

FIG. 13 is a flowchart showing the detailed procedure of the relative pole number setting process.

The first phase difference computation unit 77D determines whether the first output signal $S_1$ is greater than zero (step S51). If the first output signal $S_1$ is greater than zero (YES in step S51), the first phase difference computation unit 77D determines that the magnetic pole sensed by the first magnetic sensor 71 is the north pole, and sets the first relative pole number r1 to one (step S54). Then, the first phase difference computation unit 77D proceeds on to step S56.

On the other hand, if the first output signal $S_1$ is equal to or smaller than zero (NO in step S51), the first phase difference computation unit 77D determines whether the first output signal $S_1$ is smaller than zero (step S52). If the first output signal $S_1$ is smaller than zero (YES in step S52), the first phase difference computation unit 77D determines that the magnetic pole sensed by the first magnetic sensor 71 is the south pole, and sets the first relative pole number r1 to two (step S55). Then, the first phase difference computation unit 77D proceeds on to step S56.

If it is determined in step S52 that the first output signal $S_1$ is equal to or greater than zero (NO in step S52), that is, if the first output signal $S_1$ is zero, the first phase difference computation unit 77D determines whether the second output signal $S_2$ is greater than zero in order to determine whether the rotation angle of the input shaft 8 is 0° or 180° (step S53). If the second output signal $S_2$ is greater than zero (YES in step S53), the first phase difference computation unit 77D determines that the rotation angle of the input shaft 8 is 0°, and sets the first relative pole number r1 to one (step S54). Then, the first phase difference computation unit 77D proceeds on to step S56.

On the other hand, if the second output signal $S_2$ is equal to or smaller than zero (NO in step S53), the first phase difference computation unit 77D determines that the rotation angle of the input shaft 8 is 180°, and sets the first relative pole number r1 to two (step S55). Then, the first phase difference computation unit 77D proceeds on to step S56. In step S56, the first phase difference computation unit 77D determines whether the condition that "$S_1 \geq 0$ and $S_2 > 0$" or the condition that "$S_1 \leq 0$ and $S_2 < 0$" is satisfied. When one of the condition is satisfied (YES in step S56), the first phase difference computation unit 77D determines that the pole number of the magnetic pole sensed by the second magnetic sensor 72 is the same as the pole number of the magnetic pole sensed by the first magnetic sensor 71, and sets the second relative pole number r2 to the same number (r2=r1) as the first relative pole number r1 (step S57). Then, the first phase difference computation unit 77D proceeds on to step S36 in FIG. 11B.

On the other hand, when none of the conditions in step S56 is satisfied (NO in step S56), the first phase difference computation unit 77D determines that the pole number of the magnetic pole sensed by the second magnetic sensor 72 is greater by one than the pole number of the magnetic pole sensed by the first magnetic sensor 71, and sets the second relative pole number r2 to a number that is greater by one than the first relative pole number r1 (r2=r1+1) (step S58). Then, the first phase difference computation unit 77D proceeds on to step S36 in FIG. 11B.

Figure 14A:
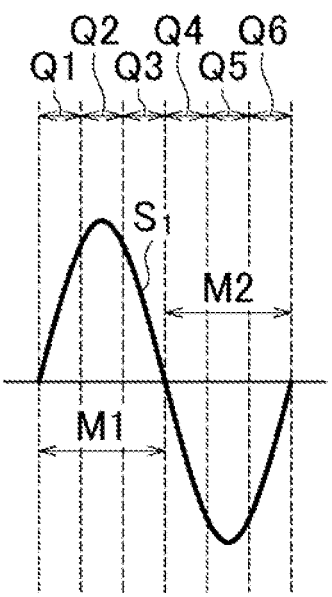
FIG. 14A is a schematic diagram illustrating the relative pole number setting process.
Figure 14B:
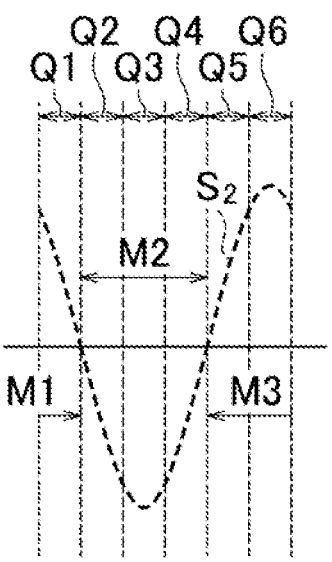
FIG. 14B is a schematic diagram illustrating the relative pole number setting process.

The reason why the second relative pole number r2 is determined on the basis of the conditions in step S56 will be described below. FIG. 14A and FIG. 14B schematically illustrate signal waveforms of the first and second output signals $S_1$, $S_2$ at the time when a magnetic pole pair constituted of, for example, the magnetic pole M1 and the magnetic pole M2 in the magnet 61 passes by the first magnetic sensor 71. In FIG. 14A and FIG. 14B, in regions indicated by Q1, Q4, the pole number of the magnetic pole sensed by the second magnetic sensor 72 is the same as the pole number of the magnetic pole sensed by the first magnetic sensor 71. On the other hand, in regions indicated by Q2, Q3, Q5, Q6, the pole number of the magnetic pole sensed by the second magnetic sensor 72 is greater by one than the pole number of the magnetic pole sensed by the first magnetic sensor 71.

In the region Q1, both the sensor values $S_1$, $S_2$ satisfy the first condition that $S_1 \geq 0$ and $S_2 > 0$. In the regions Q2, Q3, both the sensor values $S_1$, $S_2$ satisfy the second condition that $S_1 > 0$ and $S_2 \leq 0$. In the region Q4, both the sensor values $S_1$, $S_2$ satisfy the third condition that $S_1 \leq 0$ and $S_2 < 0$. In the regions Q5, Q6, both the sensor values $S_1$, $S_2$ satisfy the fourth condition that $S_1 < 0$ and $S_2 \geq 0$. When one of the first condition and the third condition is satisfied, the first phase difference computation unit 77D determines that the pole number of the magnetic pole sensed by the second magnetic sensor 72 is the same as the pole number of the magnetic pole sensed by the first magnetic sensor 71. On the other hand, when neither the first condition nor the third condition is satisfied, the first phase difference computation unit 77D determines that the pole number of the magnetic pole sensed by the second magnetic sensor 72 is greater by one than the pole number of the magnetic pole sensed by the first magnetic sensor 71.

As shown in FIG. 11A, if it is determined in step S32 that the present process is not the first process after the start of the phase difference computing process (NO in step S32), the first phase difference computation unit 77D proceeds on to step S34. In step S34, the first phase difference computation unit 77D determines whether zero-crossing of each of the sensor values $S_1$, $S_2$, that is, inversion of the sign of each of the sensor values $S_1$, $S_2$ s detected, on the basis of the sensor values $S_1$, $S_2$ stored in the memory. If zero-crossing is not detected (NO in step S34), the first phase difference computation unit 77D proceeds on to step S36.

If zero-crossing of one of the sensor values $S_1$, $S_2$ is detected in step S34 (YES in step S34), the first phase difference computation unit 77D executes a relative pole number updating process (step S35). Specifically, the first phase difference computation unit 77D changes the relative pole number r1 or r2, which is presently set for the magnetic sensor that outputs the sensor value zero-crossing of which is detected in step S34, to a number that is greater by one or a number that is smaller by one than the presently set relative pole number r1 or r2, on the basis of the rotation direction of the input shaft 8 (the magnet 61).

When the rotation direction of the input shaft 8 is the forward direction (the direction indicated by the arrow in FIG. 6), the first phase difference computation unit 77D updates the relative pole number r1 or r2, which is presently set for the magnetic sensor that outputs the sensor value zero-crossing of which is detected in step S34, to a number that is greater by one than the presently set relative pole number r1 or r2. On the other hand, when the rotation direction of the input shaft 8 is the reverse direction, the first phase difference computation unit 77D updates the relative pole number r1 or r2, which is presently set for the magnetic sensor that outputs the sensor value zero-crossing of which is detected in step S34, to a number that is smaller by one than the presently set relative pole number r1 or r2. Note that, as described above, die relative pole number that is smaller than the relative pole number of "one" by one is "eight". Further, the relative pole number that is greater than the relative pole number "eight" by one is "one".

The rotation direction of the input shaft 8 can be determined on the basis of, for example, the immediately preceding value and the present value of the output signal zero-crossing of which is detected and the present value of the other output signal. Specifically, when the output signal zero-crossing of which, is detected is the first output signal $S_1$, if the condition that "the immediately preceding value of the first output signal $S_1$ is greater than zero, the present value of the first output signal $S_1$ is equal to or smaller than zero, and the second output signal $S_2$ is smaller than zero" or the condition that "the immediately preceding value of the first output signal $S_1$ is smaller than zero, the present value of the first output signal $S_1$ is equal to or greater than zero, and the second output signal $S_2$ is greater than zero" is satisfied, it is determined that the rotation direction is the forward direction (the direction indicated by the arrow in FIG. 6).

If the condition that "the immediately preceding value of the first output signal $S_1$ is equal to or greater than zero, the present value of the first output signal $S_1$ is smaller than zero, and the second output signal $S_2$ is greater than zero" or the condition that "the immediately preceding value of the first output signal $S_1$ is equal to or smaller than zero, the present value of the first output signal $S_1$ is greater than zero, and the second output, signal $S_2$ is smaller than zero" is satisfied, it is determined that the rotation direction is the reverse direction. When the output signal zero-crossing of which is detected is the second output signal $S_2$, if the condition that "the immediately preceding value of the second output signal $S_2$ is greater than zero, the present value of the second output signal $S_2$ is equal to or smaller than zero, and the first output signal $S_1$ is greater than zero" or the condition that "the immediately preceding value of the second output signal $S_2$ is smaller than zero, the present value of the second output signal $S_2$ is equal to or greater than zero, and the first output signal $S_1$ is smaller than zero" is satisfied, it is determined that the rotation direction is the forward direction (the direction indicated by the arrow in FIG. 6). On the other hand, if the condition that "the immediately preceding value of the second output signal $S_2$ is equal to or greater than zero, the present value of the second output signal $S_2$ is smaller than zero, and the first output signal $S_1$ is smaller than zero" or the condition that "the immediately preceding value of the second output signal $S_2$ is equal to or smaller than zero, the present value of the second output signal $S_2$ is greater than zero, and the first output signal $S_1$ is greater than zero" is satisfied, it is determined that the rotation direction is the reverse direction.

When the relative pole number updating process ends, the first phase difference computation unit 7D proceeds on to step S36. In step S36, the first phase difference computation unit 77D determines whether the condition that both the first and second magnetic sensors 71, 72 sense one and the same magnetic pole for three consecutive computation periods is satisfied. This is because the expression (35) used to compute E(i)·C is derived on the precondition that all the angular width error correction values E(i) included in sensor values from both the magnetic sensors 71, 72, which are sampled at three sampling timings, are equal to each other. In each computation period, the relative numbers of the magnetic poles sensed by the magnetic sensors 71, 72 can be recognized with the use of the first relative magnetic pole number r1 and the second relative magnetic pole number r2, respectively. Therefore, if the relative magnetic pole numbers r1, r2 for multiple computation periods from the n-th preceding computation period (n is a prescribed value) to the present computation, period are stored in the memory, the first phase difference computation unit 77D can make the determination in step S37.

If the condition in step S36 is not satisfied (NO in step S36), the first phase difference computation unit 77D returns to step S31. On the other hand, if the condition in step S36 is satisfied (YES in step S36), the first phase difference computation unit 77D determines whether the condition that none of the denominators of the fractions included in the arithmetic expression (the expression (35)) for computing the value of E(i)·C are zero is satisfied (step S37). When none of the three expressions (42), (43), (44) are satisfied, the first phase difference computation unit 77D determines that the condition is satisfied.

If it is determined in step S37 that the condition in step S37 is not satisfied (NO in step S37), the first phase difference computation unit 77D returns to step S31. On the other hand, when it is determined in step S37 that the condition in step S37 is satisfied (YES in step S37), the first phase difference computation unit 77D computes the value of E(i)·C with the use of the sensor values from both the magnetic sensors 71, 72, which are sampled at three sampling timings, and the expression (35), and stores the value of E(i)·C in the area e1 (see FIG. 12) in the memory (step S38). Specifically, the first phase difference computation unit 77D stores the value E(i)·C in a storage location, which is associated with the relative pole number (the value of the presently set r1(=r2)) of the magnetic pole sensed by both the magnetic sensors 71, 72, among storage locations in the area e1 in the memory. If the value of E(i)·C has already been in the storage location associated with the value of the presently set r1 (=r2), among the storage locations in the area e1 in the memory, the first phase difference computation unit 77D overwrites and replaces the already stored value of E(i)·C with the presently computed value of E(i)·C.

Then, the first phase difference computation unit 77D determines whether values of E(i)·C corresponding to all the magnetic poles are stored in the memory (step S39). If the values of E(i)·C corresponding to all the magnetic poles are not stored in the memory (NO in step S39), the first phase difference computation unit 77D returns to step S31. On the other hand, if the values of E(i)·corresponding to all the magnetic poles are stored in the memory (YES in step S39), the first phase difference computation unit 77D computes the phase difference C with the use of the values of E(i)·C corresponding to all the magnetic poles stored in the memory and the expression (41), and stores the obtained phase difference C in the nonvolatile memory (step S40). Then, the phase difference computing process ends.

Figure 15A:
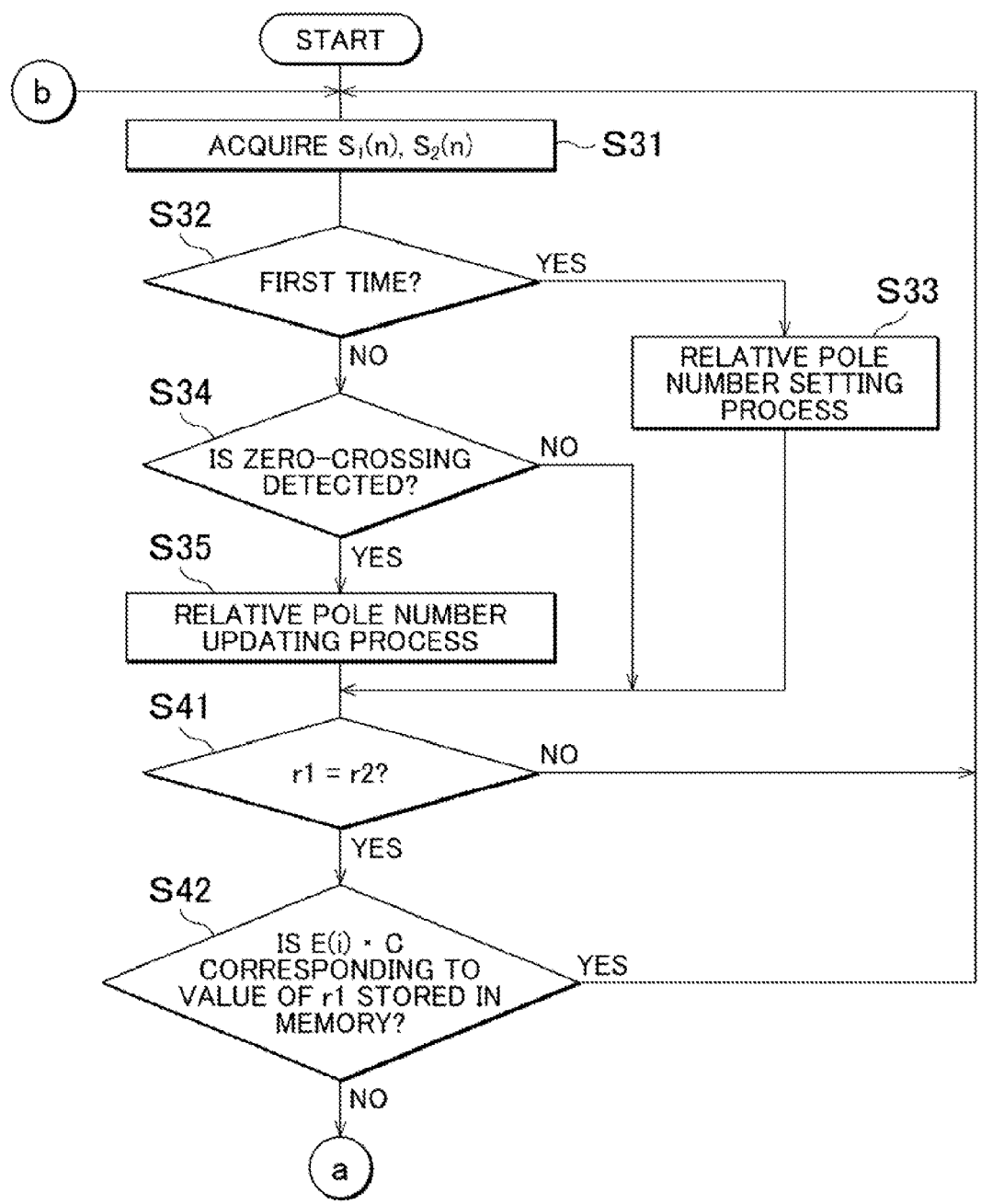
FIG. 15A is a flowchart showing a part of the procedure of a phase difference computing process executed by the first phase difference computation unit.
Figure 15B:
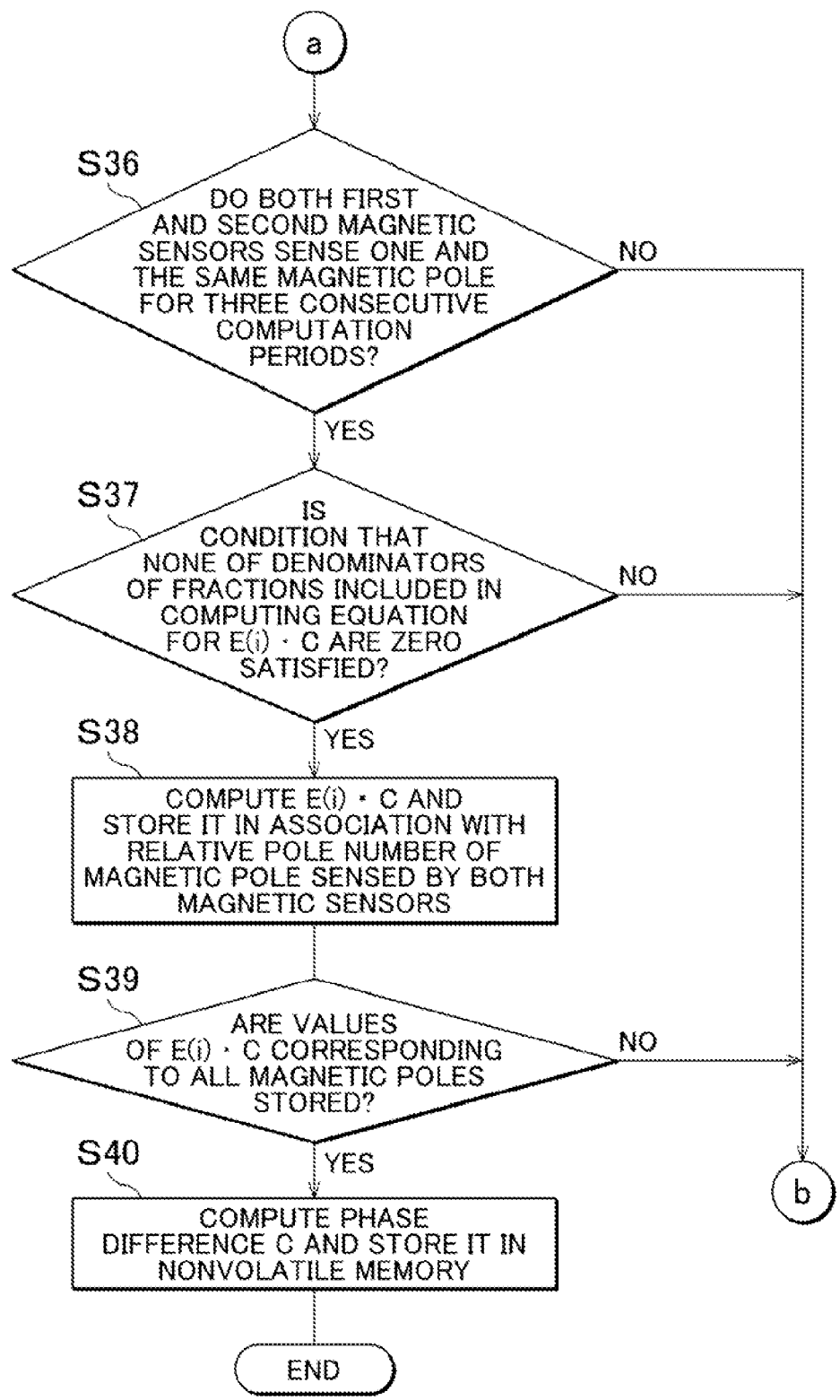
FIG. 15B is a flowchart showing the remaining part of the procedure of the phase difference computing process executed by the first phase difference computation unit.
Figure 16:
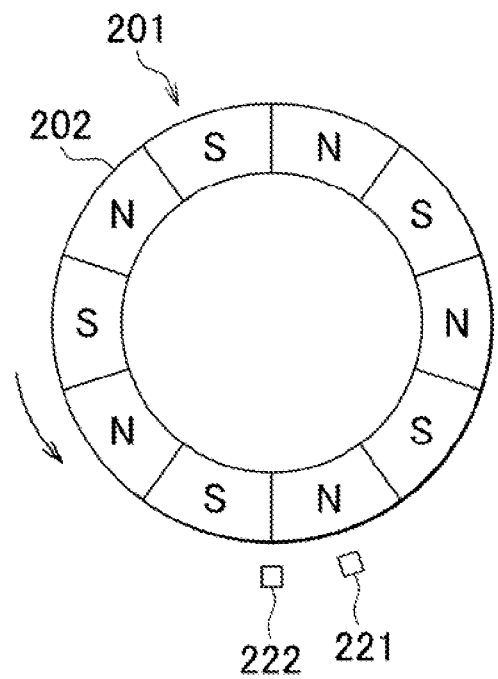
FIG. 16 is a schematic diagram illustrating a rotation angle detection method executed by a conventional rotation angle detection device.
Figure 17:
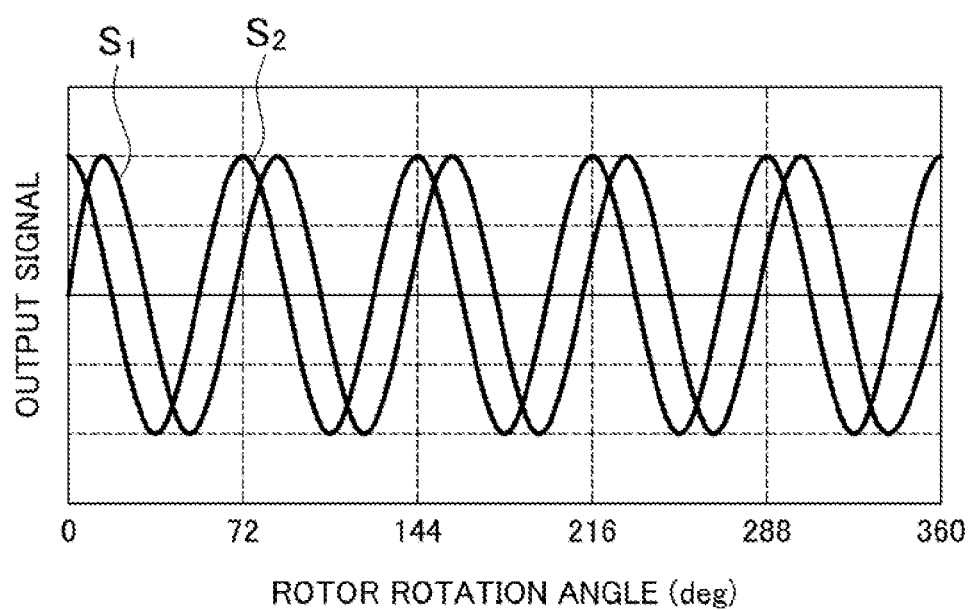
FIG. 17 is a schematic diagram illustrating waveforms of output signals from a first magnetic sensor and a second magnetic sensor.

In the foregoing embodiment, when the value of E(i)·C has already been stored in the storage location associated with the value of the presently set r1 (=r2), among storage locations in the area e1 in the memory, the already stored, value is overwritten with the value of the presently computed E(i)·C. However, the value of the presently computed E(i)·C may not be stored in such a case. Each of FIG. 15A and FIG. 15B is a flowchart showing the procedure of another example of the phase difference computing process executed by the first phase difference computation unit 77D. In FIG. 15A and FIG. 15B, steps in which the same processes as those in steps in FIG. 11A and FIG. 11B are executed are denoted by the same reference symbols as those in FIG. 11A and FIG. 11B.

In the phase difference computing process in FIG. 11A and FIG. 11B, even after the value of E(i)·C corresponding to a given magnetic pole is computed and stored in the memory, the value of E(i)·C corresponding to the given magnetic pole is computed. In the phase difference computing process in FIG. 15A and FIG. 15B, after the value of E(i)·C corresponding to a given magnetic pole is computed and stored in the memory, the value of E(i)·corresponding to the given magnetic pole is not computed.

The phase difference computing process in FIG. 15A and FIG. 15B is the same as the phase difference computing process in FIG. 11A and FIG. 11B except that step S41 and step S42 are added. Therefore, only step S41, S42 will be described. In the phase difference computing process in FIG. 15A and FIG. 15B, when the relative pole number setting process in step S33 ends, when zero-crossing is not detected in the zero-crossing detection process in step S34, or when the relative pole number updating process in step S35 ends, the first phase difference computation unit 77D proceeds on to step S41.

In step S41, the first phase difference computation unit 77D determines whether the presently set first relative number r1 and second relative number r2 are equal to each other. When the first relative number r1 and the second relative number r2 are not equal to each other (NO in step S41), the first phase difference computation unit 77D returns to step S31. When it is determined in step S41 that the first relative number r1 and the second relative number r2 are equal to each other (YES in step S41), the first phase difference computation unit 77D determines whether the value of E(i)·C has already been stored in the storage location, which is associated with the value of the presently set r1 (=r2), among storage locations in the area e1 of the memory (step S42). If the value of E(i)·C has already been stored in the storage location (YES in step S42), the first phase difference computation unit 77D returns to step S31. If it is determined in step S42 that the value of E(i)·C has not been stored in the storage location (NO in step S42), the first phase difference computation unit 77D proceeds on to step S36.

What is claimed is:

1. A phase difference detector comprising:
a multipolar magnet that rotates in accordance with rotation of a rotary body, and that has a plurality of magnetic poles;
two magnetic sensors that are a first magnetic sensor and a second magnetic sensor, and that respectively output sinusoidal signals having a predetermined phase difference in accordance with rotation of the multipolar magnet; and
a phase difference computation unit that computes the phase difference with use of the output signals from the two magnetic sensors, wherein
where an output signal $S_1$ from the first magnetic sensor is expressed by $S_1 = A_1 \sin(E_1 \theta)$ in which $A_1$ is an amplitude of the output signal $S_1$, $E_1$ is a magnetic pole width error correction value for a magnetic pole sensed by the first magnetic sensor, and $\theta$ is a rotation angle of the rotary body, an output signal $S_2$ from the second magnetic sensor is expressed by $S_2 = A_2 \sin(E_2 \theta + C)$ in which $A_2$ is an amplitude of the output signal $S_2$, $E_2$ is a magnetic pole width error correction value for a magnetic pole sensed by the second magnetic sensor, and C is a phase difference between the output signal $S_2$ from the second magnetic sensor and the output signal $S_1$ from the first magnetic sensor, m is the number of the magnetic poles of the multipolar magnet, i is a natural number from 1 to m, which is used to relatively identify each of the magnetic poles, and E(i) is a magnetic pole width error correction value corresponding to each of the magnetic poles,
the phase difference computation unit includes
a first computation unit that executes a process of computing a value of E(i)·C corresponding to one and a same given magnetic pole sensed by the two magnetic sensors with use of six output signals that are sampled at three different timings while the two magnetic sensors are sensing the given magnetic pole when the rotary body is rotating, until values of E(i)·C corresponding to all the magnetic poles are computed, and
a second computation unit that computes the phase difference C with use of the values of E(i)·C corresponding to all the magnetic poles computed by the first computation unit and the number m of the magnetic poles of the multipolar magnet.

2. The phase difference detector according to claim 1, where n is a number of a present sampling period and the six output signals are expressed by expressions (a1) to (a6), the first computation unit is configured to compute the value of E(i)·C of the given magnetic pole according to an expression (b)

$$S_1(n) = A_1 \sin(E(i) \cdot \theta(n)) \quad (a1)$$

$$S_1(n-1) = A_1 \sin(E(i) \cdot \theta(n-1)) \quad (a2)$$

$$S_1(n-2) = A_1 \sin(E(i) \cdot \theta(n-2)) \quad (a3)$$

$$S_2(n) = A_2 \sin(E(i) \cdot \theta(n) + C) \quad (a4)$$

$$S_2(n-1) = A_2 \sin(E(i) \cdot \theta(n-1) + C) \quad (a5)$$

$$S_2(n-2) = A_2 \sin(E(i) \cdot \theta(n-2) + C) \quad (a6)$$

$$E(i) \cdot C = \frac{1}{2} \cdot \cos^{-1}\left( \frac{q_1^2 \cdot t^2 - 2q_1 q_2 t + q_2^2}{2t(S_1[n]S_2[n] - S_1[n-1]S_2[n-1])^2} - 1 \right) \quad (b)$$

where
$q_1 = S_1[n-1]^2 - S_1[n]^2$
$q_2 = S_2[n]^2 - S_2[n-1]^2$ $$t = \frac{S_1[n]S_2[n]q_3 + S_1[n-1]S_2[n-1]q_4 + S_1[n-2]S_2[n-2]q_1}{S_1[n]S_2[n]q_5 + S_1[n-1]S_2[n-1]q_6 + S_1[n-2]S_2[n-2]q_2}$$

$q_3 = S_1[n-2]^2 - S_1[n-1]^2$
$q_4 = S_1[n]^2 - S_1[n-2]^2$
$q_5 = S_2[n-1]^2 - S_2[n-2]^2$
$q_6 = S_2[n-2]^2 - S_2[n]^2$.

3. A rotation angle detection device comprising:
the phase difference detector according to claim 2; and
a rotation angle computation unit that computes a rotation angle of the rotary body with use of four output signals from the two magnetic sensors, the four output signals being sampled at two different timings, and the phase difference C detected by the phase difference detector.

4. A rotation angle detection device comprising:
the phase difference detector according to claim 2; and
a rotation angle computation unit that computes a rotation angle of the rotary body with use of six output signals from the two magnetic sensors, the six output signals being sampled at three different timings, and the phase difference C detected by the phase difference detector.

5. The phase difference detector according to claim 1, wherein the second computation unit is configured to compute the phase difference C according to an expression (c):

$$C = \frac{m}{\sum_{i=1}^{m} E(i) \cdot C}. \quad (c)$$

6. A rotation angle detection device comprising:
the phase difference detector according to claim 5; and
a rotation angle computation unit that computes a rotation angle of the rotary body with use of four output signals from the two magnetic sensors, the four output signals being sampled at two different timings, and the phase difference C detected by the phase difference detector.

7. A rotation angle detection device comprising:
the phase difference detector according to claim 1; and
a rotation angle computation unit that computes a rotation angle of the rotary body with use of four output signals from the two magnetic sensors, the four output signals being sampled at two different timings, and the phase difference C detected by the phase difference detector.

8. A rotation angle detection device comprising:
the phase difference detector according to claim 1; and
a rotation angle computation unit that computes a rotation angle of the rotary body with use of six output signals from the two magnetic sensors, the six output signals being sampled at three different timings, and the phase difference C detected by the phase difference detector.

9. A rotation angle detection device comprising:
the phase difference detector according to claim 5; and
a rotation angle computation unit that computes a rotation angle of the rotary body with use of six output signals from the two magnetic sensors, the six output signals being sampled at three different timings, and the phase difference C detected by the phase difference detector.

* * * * *